(12) United States Patent
Venkatraman et al.

(10) Patent No.: US 10,659,505 B2
(45) Date of Patent: *May 19, 2020

(54) METHOD AND SYSTEM FOR NAVIGATION BETWEEN SEGMENTS OF REAL TIME, ADAPTIVE AND NON-SEQUENTIALLY ASSEMBLED VIDEO

(71) Applicants: N. Dilip Venkatraman, Greater Noida (IN); Savitri Dilip, Greater Noida (IN)

(72) Inventors: N. Dilip Venkatraman, Greater Noida (IN); Savitri Dilip, Greater Noida (IN)

(*) Notice: Subject to any disclaimer, the term of this patent is extended or adjusted under 35 U.S.C. 154(b) by 0 days.

This patent is subject to a terminal disclaimer.

(21) Appl. No.: 15/250,716

(22) Filed: Aug. 29, 2016

(65) Prior Publication Data

US 2018/0013806 A1 Jan. 11, 2018

(51) Int. Cl.
*H04L 29/06* (2006.01)
*H04L 29/08* (2006.01)
*H04N 21/6334* (2011.01)
*H04N 21/258* (2011.01)
*G06F 17/30* (2006.01)
*G11B 27/00* (2006.01)
*H04N 21/234* (2011.01)
*H04N 21/81* (2011.01)
*H04N 21/845* (2011.01)
(Continued)

(52) U.S. Cl.
CPC ......... *H04L 65/4084* (2013.01); *G06F 17/30* (2013.01); *G11B 27/00* (2013.01); *H04L 65/604* (2013.01); *H04L 67/306* (2013.01); *H04N 21/23412* (2013.01); *H04N 21/25891* (2013.01); *H04N 21/63345* (2013.01); *H04N 21/8193* (2013.01); *H04N 21/8456* (2013.01); *H04N 21/8541* (2013.01); *H04N 21/4312* (2013.01)

(58) Field of Classification Search
CPC . H04L 65/4084; H04L 67/306; H04L 65/604; H04N 21/4312; H04N 21/25891; H04N 21/63345; H04N 21/8541; H04N 21/8456; H04N 21/8193; H04N 21/23412; G06F 17/30; G11B 27/00
See application file for complete search history.

(56) References Cited

U.S. PATENT DOCUMENTS 8,856,825 B1 * 10/2014 Mick, Jr. .............. H04N 21/812
725/32
9,138,652 B1 9/2015 Thompson et al.
(Continued)

*Primary Examiner* — Kostas J Katsikis
(74) *Attorney, Agent, or Firm* — Kolisch Hartwell, P.C.

(57) ABSTRACT

The present disclosure provides a system and method for enabling navigation to one or more discrete segments of a real time dynamic and adaptive non-linear, non-sequentially assembled video. The method includes reception of a set of preference data associated with a user from a pre-defined selection criteria and a set of user authentication data. Accordingly, the method includes fetching of one or more tagged videos related to the set of preference data. The method includes fragmentation of the one or more tagged videos into the one or more tagged fragments. Further, the method includes clustering of one or more mapped fragments in a pre-defined order of preference. Furthermore, the method includes insertion of one or more interactive navigation options in one or more regions. Also, the method includes serving of the assembled video and inserted one or more interactive navigation options to the user.

18 Claims, 10 Drawing Sheets

(51) Int. Cl.
   *H04N 21/8541*   (2011.01)
   *H04N 21/431*    (2011.01)

(56) References Cited

U.S. PATENT DOCUMENTS

| | | | |
|---|---|---|---|
| 9,602,884 B1 | 3/2017 | Eldering et al. | |
| 9,681,160 B2* | 6/2017 | McIntire | H04N 21/278 |
| 9,743,145 B2* | 8/2017 | Abecassis | H04N 21/4758 |
| 9,792,386 B2* | 10/2017 | Wellen | G06F 17/30905 |
| 9,798,828 B2* | 10/2017 | Wellen | G06F 17/30905 |
| 9,875,318 B2* | 1/2018 | Wellen | G06F 17/30905 |
| 9,924,444 B2* | 3/2018 | Jiang | H04W 48/06 |
| 9,934,322 B2* | 4/2018 | Wellen | G06F 17/30905 |
| 10,085,049 B2 | 9/2018 | Venkatraman et al. | |
| 2002/0013943 A1 | 1/2002 | Haberman et al. | |
| 2002/0099955 A1 | 7/2002 | Peled et al. | |
| 2002/0120925 A1 | 8/2002 | Logan | |
| 2002/0131496 A1 | 9/2002 | Vasudevan et al. | |
| 2005/0086692 A1 | 4/2005 | Dudkiewicz et al. | |
| 2005/0091696 A1 | 4/2005 | Wolfe et al. | |
| 2006/0053470 A1* | 3/2006 | Colter | G06F 17/2247 725/135 |
| 2007/0250901 A1 | 10/2007 | McIntire et al. | |
| 2008/0062322 A1 | 3/2008 | Dey et al. | |
| 2008/0071507 A1* | 3/2008 | Hodgins | G01S 5/16 703/6 |
| 2009/0148124 A1 | 6/2009 | Athsani et al. | |
| 2010/0169786 A1* | 7/2010 | O'Brien | G06F 17/30817 715/738 |
| 2011/0107215 A1* | 5/2011 | Klappert | G06F 3/167 715/716 |
| 2011/0107369 A1* | 5/2011 | O'Brien | G06F 17/30029 725/38 |
| 2011/0305436 A1 | 12/2011 | Haberman et al. | |
| 2012/0087637 A1 | 4/2012 | Logan et al. | |
| 2013/0188923 A1 | 7/2013 | Hartley et al. | |
| 2014/0165093 A1* | 6/2014 | Redol | H04N 21/812 725/32 |
| 2014/0274297 A1* | 9/2014 | Lewis | A63F 13/00 463/20 |
| 2015/0074732 A1 | 3/2015 | Green et al. | |
| 2015/0082349 A1 | 3/2015 | Ishtiaq et al. | |
| 2015/0120768 A1* | 4/2015 | Wellen | G06F 17/20 707/755 |
| 2015/0199995 A1* | 7/2015 | Silverstein | H04N 21/8541 386/249 |
| 2015/0339383 A1* | 11/2015 | Johnson | G06F 17/30787 715/723 |
| 2016/0094888 A1* | 3/2016 | Peterson | H04N 21/4821 725/39 |
| 2016/0147959 A1* | 5/2016 | Mariottini | G06F 19/345 706/46 |
| 2016/0150290 A1* | 5/2016 | Chandler | H04N 21/812 725/32 |
| 2016/0191971 A1* | 6/2016 | Benitez | H04N 21/4333 725/34 |
| 2016/0277805 A1 | 9/2016 | Haberman et al. | |
| 2016/0295248 A1 | 10/2016 | Carney Landow et al. | |
| 2017/0171631 A1 | 6/2017 | Peterson | |
| 2017/0318347 A1* | 11/2017 | Abecassis | H04N 21/4884 |
| 2017/0372360 A1* | 12/2017 | Duggal | G06Q 30/0255 |
| 2018/0014044 A1 | 1/2018 | Venkatraman et al. | |
| 2018/0014052 A1 | 1/2018 | Venkatraman et al. | |

* cited by examiner

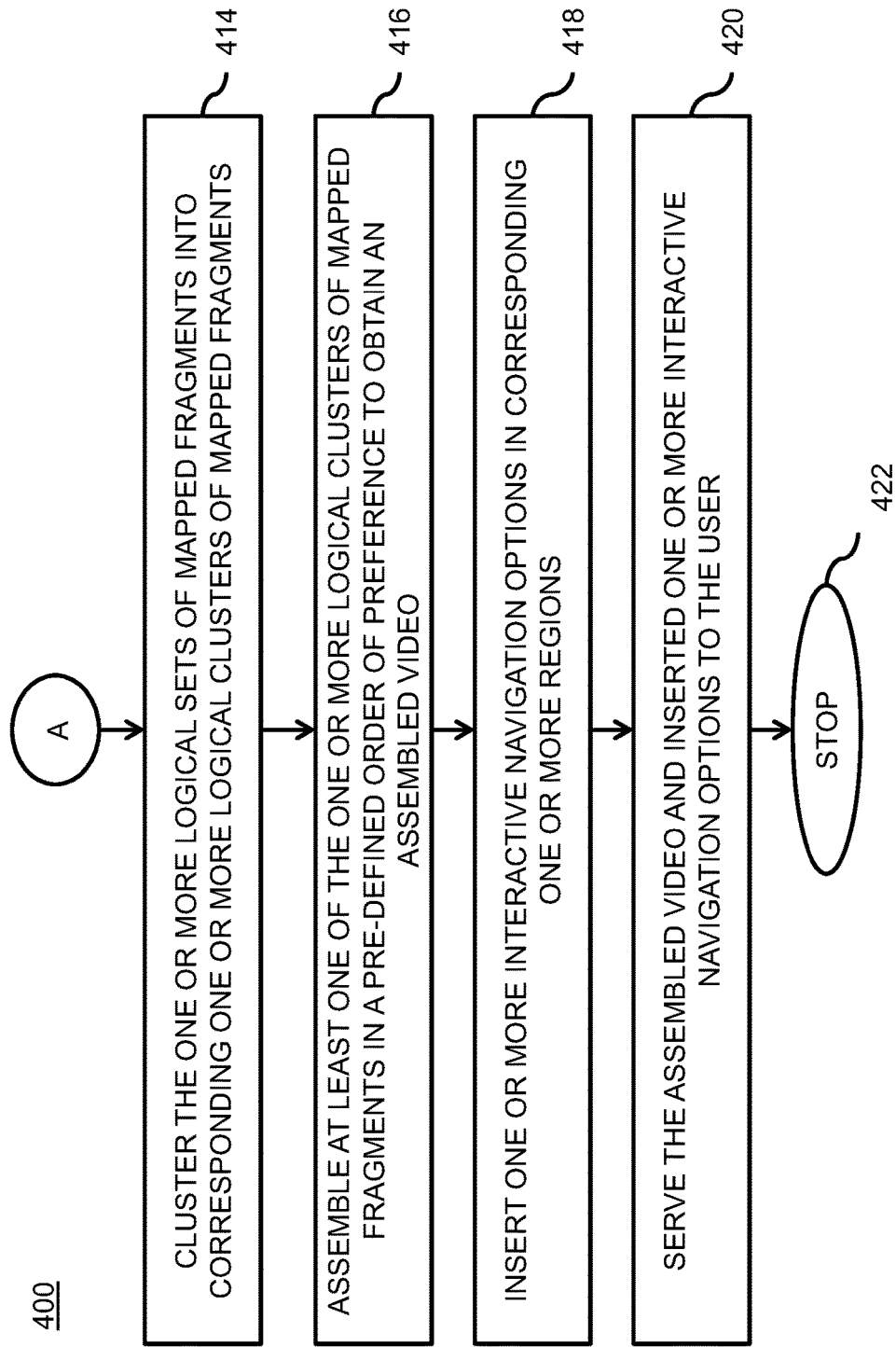

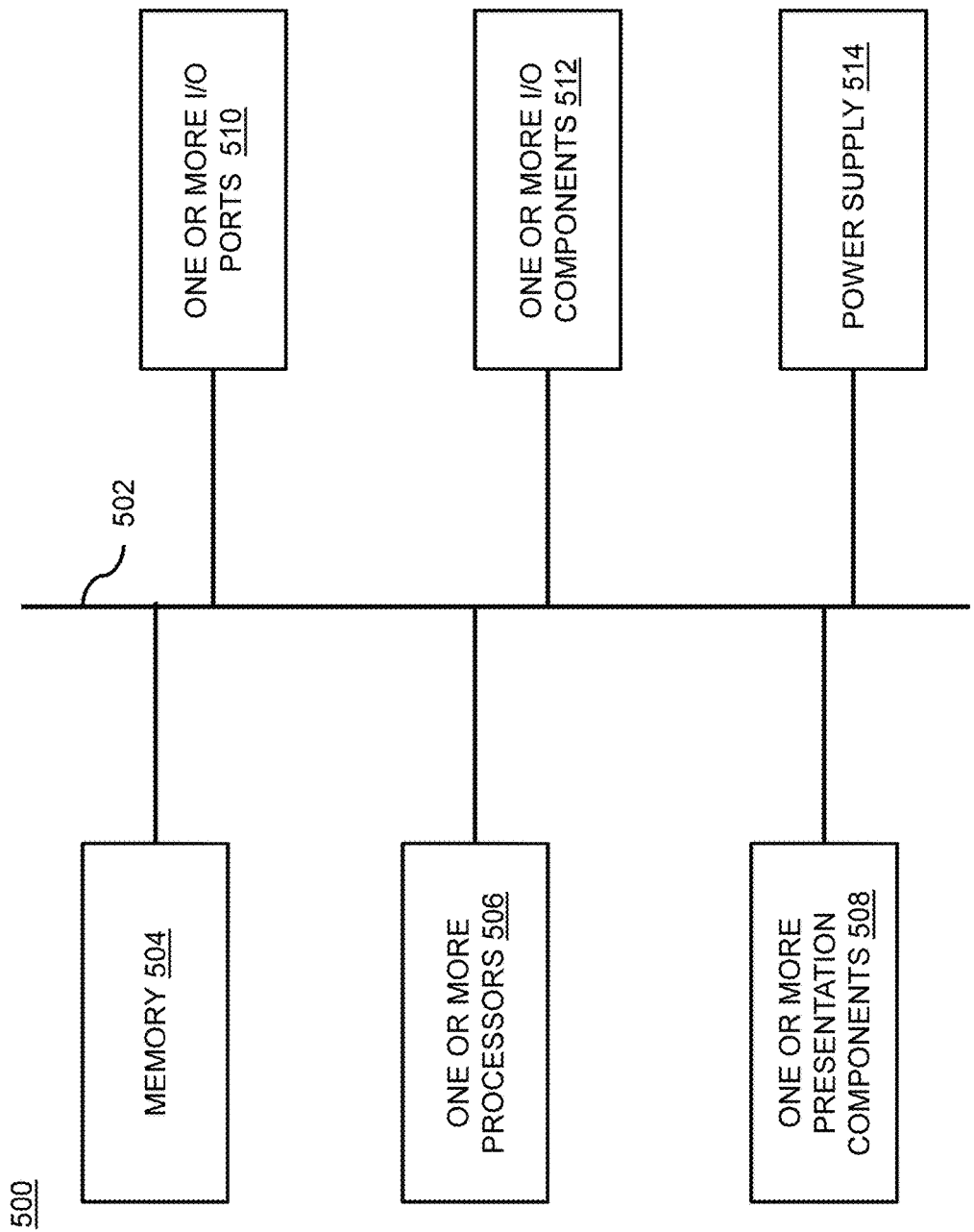

METHOD AND SYSTEM FOR NAVIGATION BETWEEN SEGMENTS OF REAL TIME, ADAPTIVE AND NON-SEQUENTIALLY ASSEMBLED VIDEO

TECHNICAL FIELD

The present disclosure relates to a field of online video streaming. More specifically, the present disclosure relates to a method and system for enabling navigation to discrete segments of an assembled video.

BACKGROUND

With the advent of online multimedia revolution along with sudden rise in network bandwidth in recent years, the popularity of online video on demand platforms has suddenly gained momentum. These video on demand platforms provide a plethora of online streaming services. These services include television news, sports shows, television shows, non-televised shows, interviews, location specific events, national events, international events, movies and the like. The videos are arranged in different categories with different tags for complete video. Nowadays, there are many platforms that provide video assembling services on multiple on demand platforms. These platforms assemble videos based on complete set of tags and don't take into account dynamically changing user interests. In addition, these platforms don't perform dynamic meta-tagging based context and ontology of search queries of users on fragments of videos. The present platforms are inefficient in providing personalized assembled videos to individual users.

SUMMARY

In an aspect, the present disclosure provides a method for enabling navigation to one or more discrete segments of a real time dynamic and adaptive, non-linear and non-sequentially assembled video. The method includes a step of receiving a set of preference data associated with a user from pre-defined selection criteria and a set of user authentication data. The pre-defined selection criteria are associated with a digitally processed repository of videos. Further, the method includes another step of fetching the one or more tagged videos from the digitally processed repository of videos. The one or more tagged videos are related to the set of preference data of the user. The method includes yet another step of fragmenting each tagged video of the one or more tagged videos into the one or more tagged fragments. Going further, the method includes yet another step of segregating one or more mapped fragments of the one or more tagged fragments into one or more logical sets of mapped fragments. The method includes yet another step of mining semantic context information from each mapped fragment of the one or more mapped fragments and each logical set of mapped fragments of the one or more logical sets of mapped fragments. Furthermore, the method includes yet another step of clustering the one or more logical sets of mapped fragments into corresponding one or more logical clusters of mapped fragments. The method includes yet another step of assembling at least one of the one or more logical clusters of mapped fragments in a pre-defined order of preference to obtain an assembled video. The method includes yet another step of inserting one or more interactive navigation options in one or more regions of the video assembling platform. In addition, the method includes yet another step of serving the assembled video and inserted one or more interactive navigation options to the user. Moreover, the one or more tagged videos are fetched based on a correlation of a set of tags with the set of preference data of the user. The set of tags is associated with each tagged video of the one or more tagged videos. Furthermore, each tagged video is fragmented into the one or more tagged fragments. Each tagged fragment is characterized by a pre-determined interval of time. Accordingly, each tagged video is fragmented based on segmentation of the tagged video for each pre-determined interval of time. Going further, the one or more mapped fragments are segregated based on a positive mapping of keywords from the set of preference data with the set of tags. The set of tags is associated with each tagged fragment of the one or more tagged fragments. The semantic context information includes object specific context information and scene specific context information of each mapped fragment and each logical set of mapped fragments Moreover, each logical cluster of mapped fragments is clustered based on analysis of the set of preference data of the user and the semantic context information. The one or more navigation options are inserted based on the set of preference data of the user, a real time viewing and selection behavior of the user and the semantic context information. The one or more interactive navigation options are presented as at least one type of presentation options of pre-defined types of presentation options. The one or more interactive navigation options are presented to enable the user to navigate to one or more discrete segments of the assembled video.

In an embodiment of the present disclosure, the method includes yet another step of creating a user profile based on the set of user authentication data and the set of preference data. The user profile includes the set of preference data segregated on the basis of pre-defined selection criteria, the set of user authentication data, the past set of preference data, a physical access location of the user and a bio data of the user. In addition, the set of user authentication data includes an email address, an authentication key, a physical location and a time of request of video.

In an embodiment of the present disclosure, the method includes yet another step of transcoding the assembled video into a pre-defined video format. The assembled video is transcoded by utilizing a codec. The assembled video is transcoded to enable adaptive bitrate streaming on each communication device of the one or more communication devices. The adaptive bitrate streaming is based on one or more device parameters and one or more network parameters. The one or more device parameters include screen size, screen resolution and pixel density. The one or more network parameters include an IP address, network bandwidth, maximum bitrate support over network, throughput, connection strength and location of requesting server.

In an embodiment of the present disclosure, the method includes yet another step of rendering the assembled video for addition of one or more interactive elements and bi-directional flow.

In an embodiment of the present disclosure, the method includes yet another step of updating the assembled video in the digitally processed repository of videos. In addition, the user profile of the user, the first set of information and the set of authentication data is updated in the real time. The user profile is updated based on variations in the set of preference data.

In an embodiment of the present disclosure, the pre-defined types of presentation options include one or more graphical presentations and one or more textual presentations. In addition, the pre-defined types of presentation options include one or more thumbnails corresponding to the subsequent mapped one or more clips and one or more animations.

In an embodiment of the present disclosure, the one or more regions include one or more banner slots and one or more slots between the assembled video. In addition, the one or more regions include one or more overlay regions covering a pre-defined area of corresponding frames of the assembled video. The one or more regions for the insertion of the one or more interactive navigation options are determined by at least one of one or more publishers and one or more administrators.

In an embodiment of the present disclosure, the one or more interactive navigation options include one or more queries based option for navigation to a discrete segment of the one or more discrete segments of the assembled video. In addition, the one or more interactive navigation options include one or more thumbnail based bi-directional option of navigation to the discrete segment of the assembled video. Moreover, the one or more interactive navigation options include one or more ratings based option of navigation to the discrete segment of the assembled video.

In an embodiment of the present disclosure, the set of user authentication data includes an email address, a bio-data of the user, an authentication key, a physical location, a standard time and time zone of login.

In an embodiment of the present disclosure, the pre-defined selection criteria is based on date, time zone, day, season, physical location, occasion, an identified name and a video genre.

In an embodiment of the present disclosure, the pre-defined order of preference is derived from the set of preference data, the semantic context information, user profile and user profiles of any user having similar preferences.

In an embodiment of the present disclosure, each tagged video of the one or more tagged videos is manually tagged by at least one of one or more publishers.

In an embodiment of the present disclosure, each tagged video of the one or more tagged videos is manually tagged by at least one of one or more system administrators.

In an embodiment of the present disclosure, each tagged video of the one or more tagged videos are tagged based on voice instructions of one or more system administrators.

In an embodiment of the present disclosure, each tagged video of the one or more tagged videos is tagged based on audio rendering and analysis.

In another aspect, the present disclosure provides a computer system. The computer system includes one or more processors and a memory. The memory is coupled to the one or more processors. The memory is used to store instructions. The instructions in the memory when executed by the one or more processors cause the one or more processors to perform a method. The one or more processors perform the method for enabling navigation to one or more discrete segments of a real time dynamic and adaptive non-linear and non-sequentially assembled video. The method includes a step of receiving a set of preference data associated with a user from pre-defined selection criteria and a set of user authentication data. The pre-defined selection criteria are associated with a digitally processed repository of videos. Further, the method includes another step of fetching the one or more tagged videos from the digitally processed repository of videos. The one or more tagged videos are related to the set of preference data of the user. The method includes yet another step of fragmenting each tagged video of the one or more tagged videos into the one or more tagged fragments. Going further, the method includes yet another step of segregating one or more mapped fragments of the one or more tagged fragments into one or more logical sets of mapped fragments. The method includes yet another step of mining semantic context information from each mapped fragment of the one or more mapped fragments and each logical set of mapped fragments of the one or more logical sets of mapped fragments. Furthermore, the method includes yet another step of clustering the one or more logical sets of mapped fragments into corresponding one or more logical clusters of mapped fragments. The method includes yet another step of assembling at least one of the one or more logical clusters of mapped fragments in a pre-defined order of preference to obtain an assembled video. The method includes yet another step of inserting one or more interactive navigation options in one or more regions of the video assembling platform. In addition, the method includes yet another step of serving the assembled video and inserted one or more interactive navigation options to the user. Moreover, the one or more tagged videos are fetched based on a correlation of a set of tags with the set of preference data of the user. The set of tags is associated with each tagged video of the one or more tagged videos. Furthermore, each tagged video is fragmented into the one or more tagged fragments. Each tagged fragment is characterized by a pre-determined interval of time. Accordingly, each tagged video is fragmented based on segmentation of the tagged video for each pre-determined interval of time. Going further, the one or more mapped fragments are segregated based on a positive mapping of keywords from the set of preference data with the set of tags. The set of tags is associated with each tagged fragment of the one or more tagged fragments. The semantic context information includes object specific context information and scene specific context information of each mapped fragment and each logical set of mapped fragments Moreover, each logical cluster of mapped fragments is clustered based on analysis of the set of preference data of the user and the semantic context information. The one or more navigation options are inserted based on the set of preference data of the user, a real time viewing and selection behavior of the user and the semantic context information. The one or more interactive navigation options are presented as at least one type of presentation options of pre-defined types of presentation options. The one or more interactive navigation options are presented to enable the user to navigate to one or more discrete segments of the assembled video.

In yet another aspect, the present disclosure provides a computer-readable storage medium. The computer readable storage medium enables encoding of computer executable instructions. The computer executable instructions when executed by at least one processor perform a method. The at least one processor performs the method for enabling navigation to one or more discrete segments of a real time dynamic and adaptive, non-linear and non-sequentially assembled video. The method includes a step of receiving a set of preference data associated with a user from pre-defined selection criteria and a set of user authentication data. The pre-defined selection criteria are associated with a digitally processed repository of videos. Further, the method includes another step of fetching the one or more tagged videos from the digitally processed repository of videos. The one or more tagged videos are related to the set of preference data of the user. The method includes yet another step of fragmenting each tagged video of the one or more tagged videos into the one or more tagged fragments. Going further, the method includes yet another step of segregating one or more mapped fragments of the one or more tagged fragments into one or more logical sets of mapped fragments. The method includes yet another step of mining semantic context information from each mapped fragment of the one or more mapped fragments and each logical set of mapped fragments of the one or more logical sets of mapped fragments. Furthermore, the method includes yet another step of clustering the one or more logical sets of mapped fragments into corresponding one or more logical clusters of mapped fragments. The method includes yet another step of assembling at least one of the one or more logical clusters of mapped fragments in a pre-defined order of preference to obtain an assembled video. The method includes yet another step of inserting one or more interactive navigation options in one or more regions of the video assembling platform. In addition, the method includes yet another step of serving the assembled video and inserted one or more interactive navigation options to the user. Moreover, the one or more tagged videos are fetched based on a correlation of a set of tags with the set of preference data of the user. The set of tags is associated with each tagged video of the one or more tagged videos. Furthermore, each tagged video is fragmented into the one or more tagged fragments. Each tagged fragment is characterized by a pre-determined interval of time. Accordingly, each tagged video is fragmented based on segmentation of the tagged video for each pre-determined interval of time. Going further, the one or more mapped fragments are segregated based on a positive mapping of keywords from the set of preference data with the set of tags. The set of tags is associated with each tagged fragment of the one or more tagged fragments. The semantic context information includes object specific context information and scene specific context information of each mapped fragment and each logical set of mapped fragments Moreover, each logical cluster of mapped fragments is clustered based on analysis of the set of preference data of the user and the semantic context information. The one or more navigation options are inserted based on the set of preference data of the user, a real time viewing and selection behavior of the user and the semantic context information. The one or more interactive navigation options are presented as at least one type of presentation options of pre-defined types of presentation options. The one or more interactive navigation options are presented to enable the user to navigate to one or more discrete segments of the assembled video.

BRIEF DESCRIPTION OF THE FIGURES

Figure 1A:
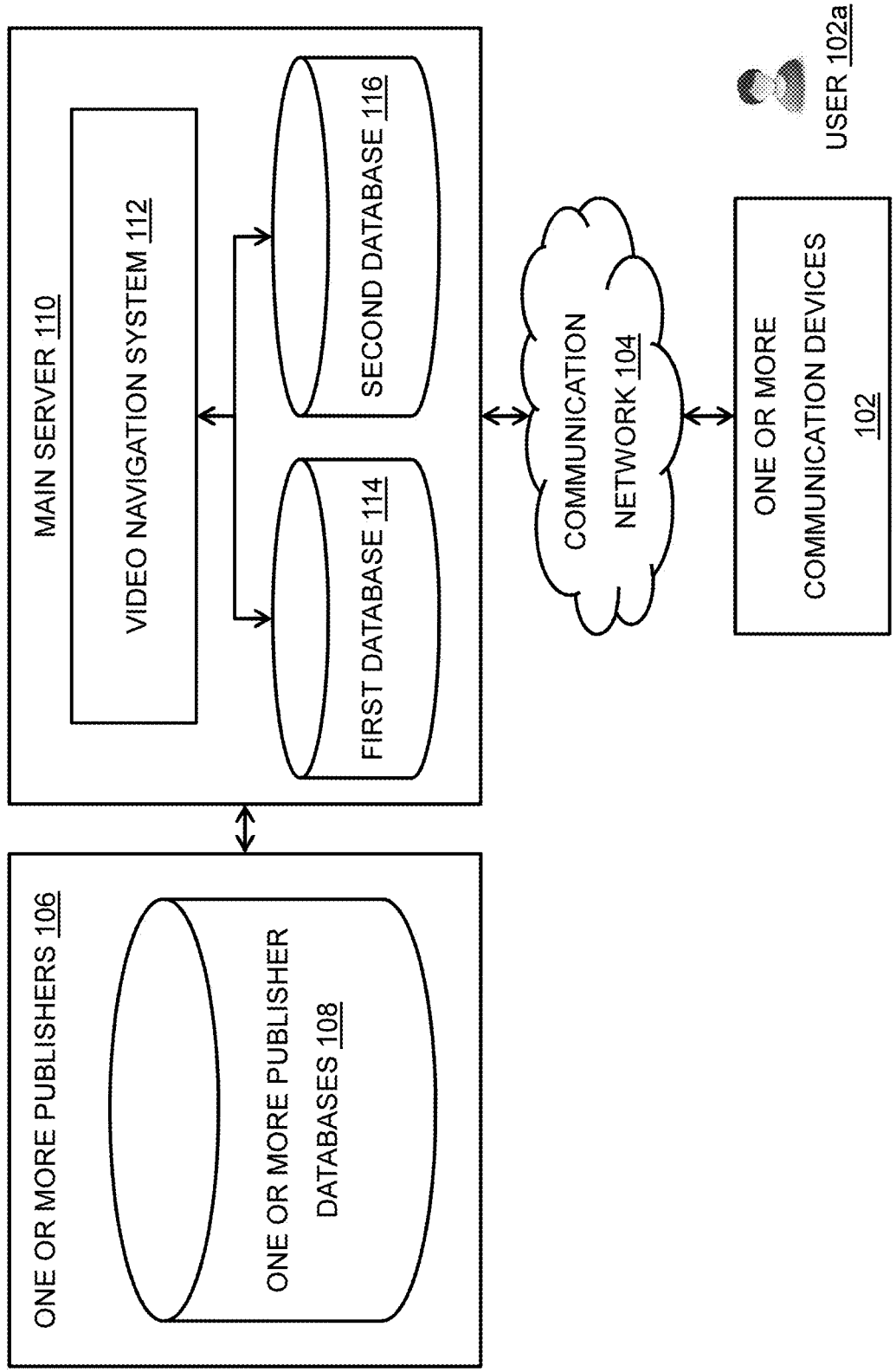
Figure 1B:
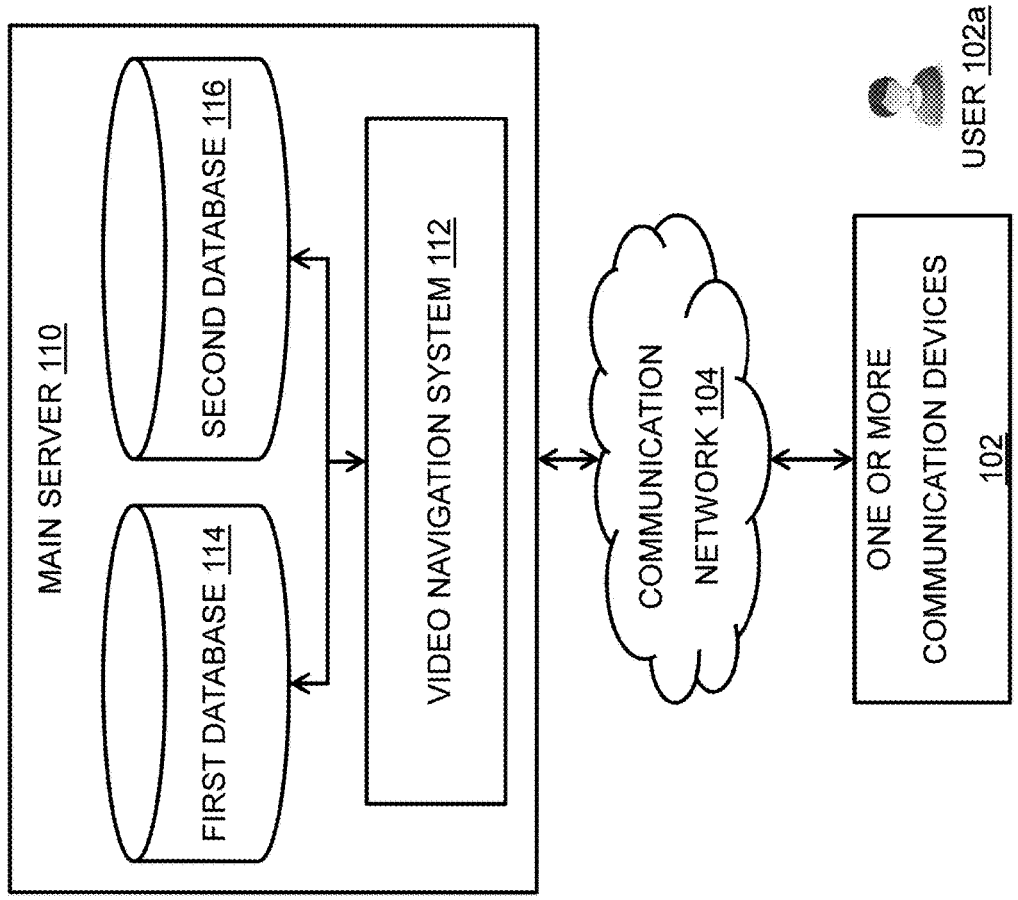
Figure 1C:
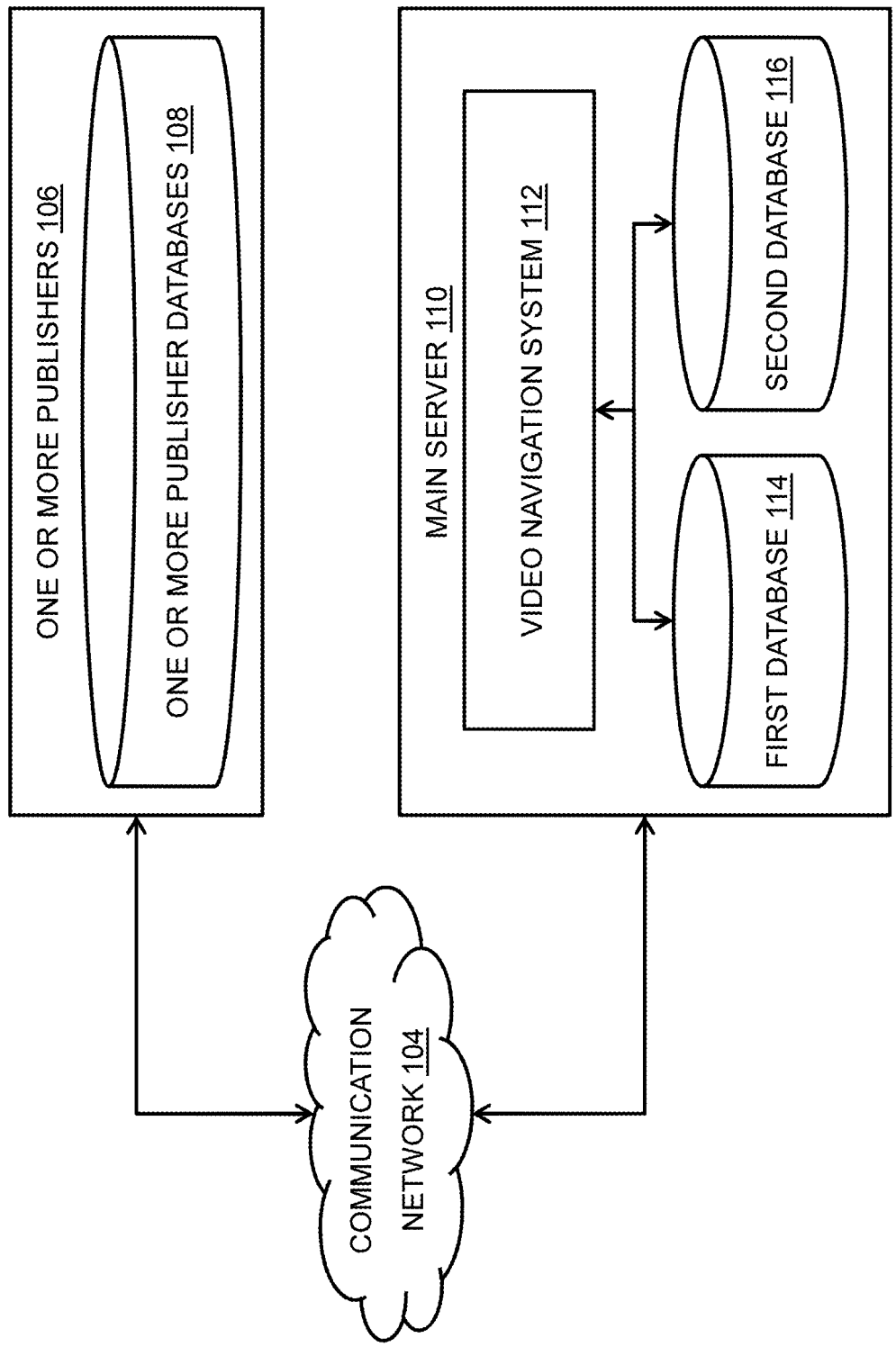
Figure 1D:
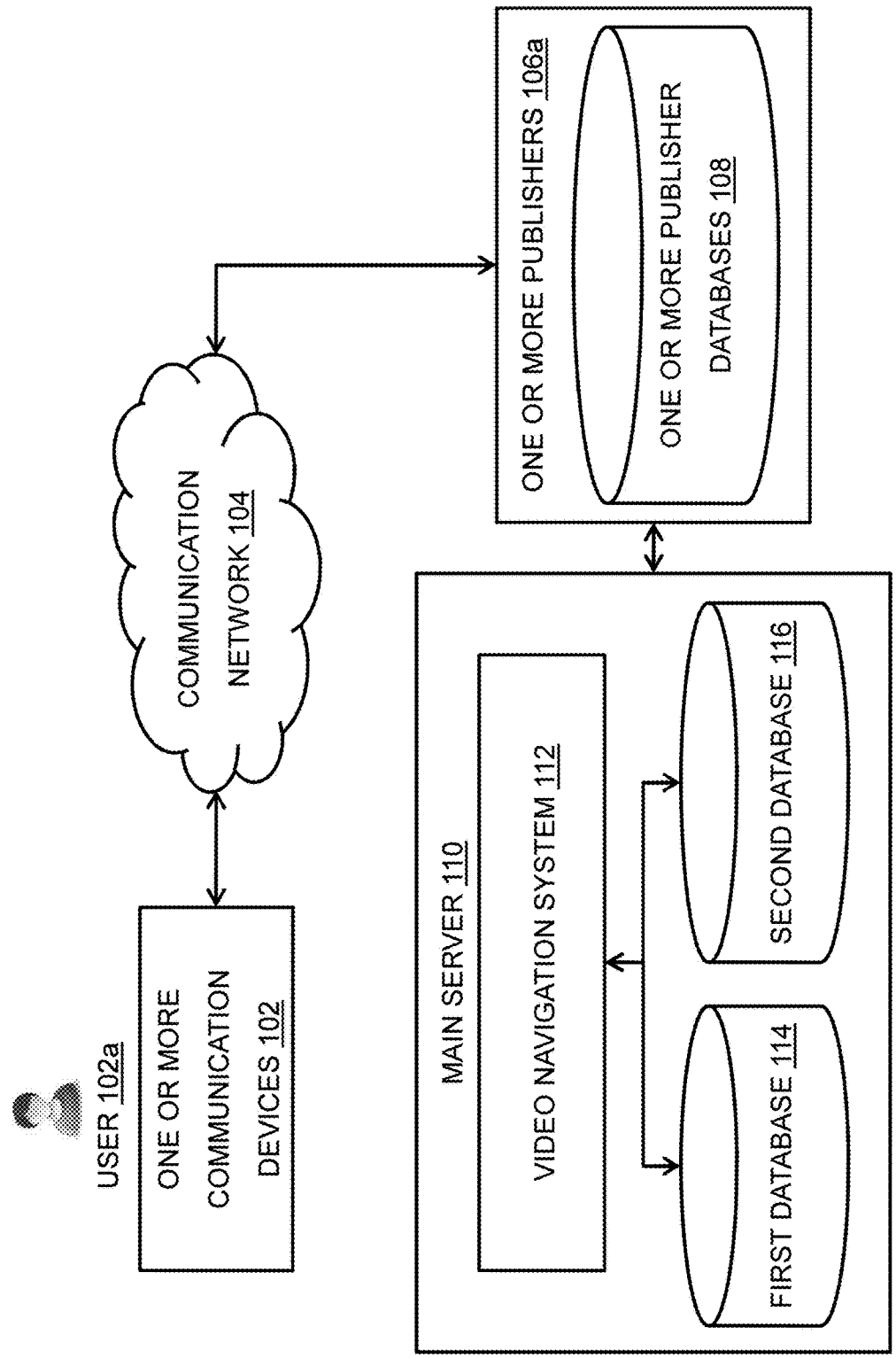
Figure 1E:
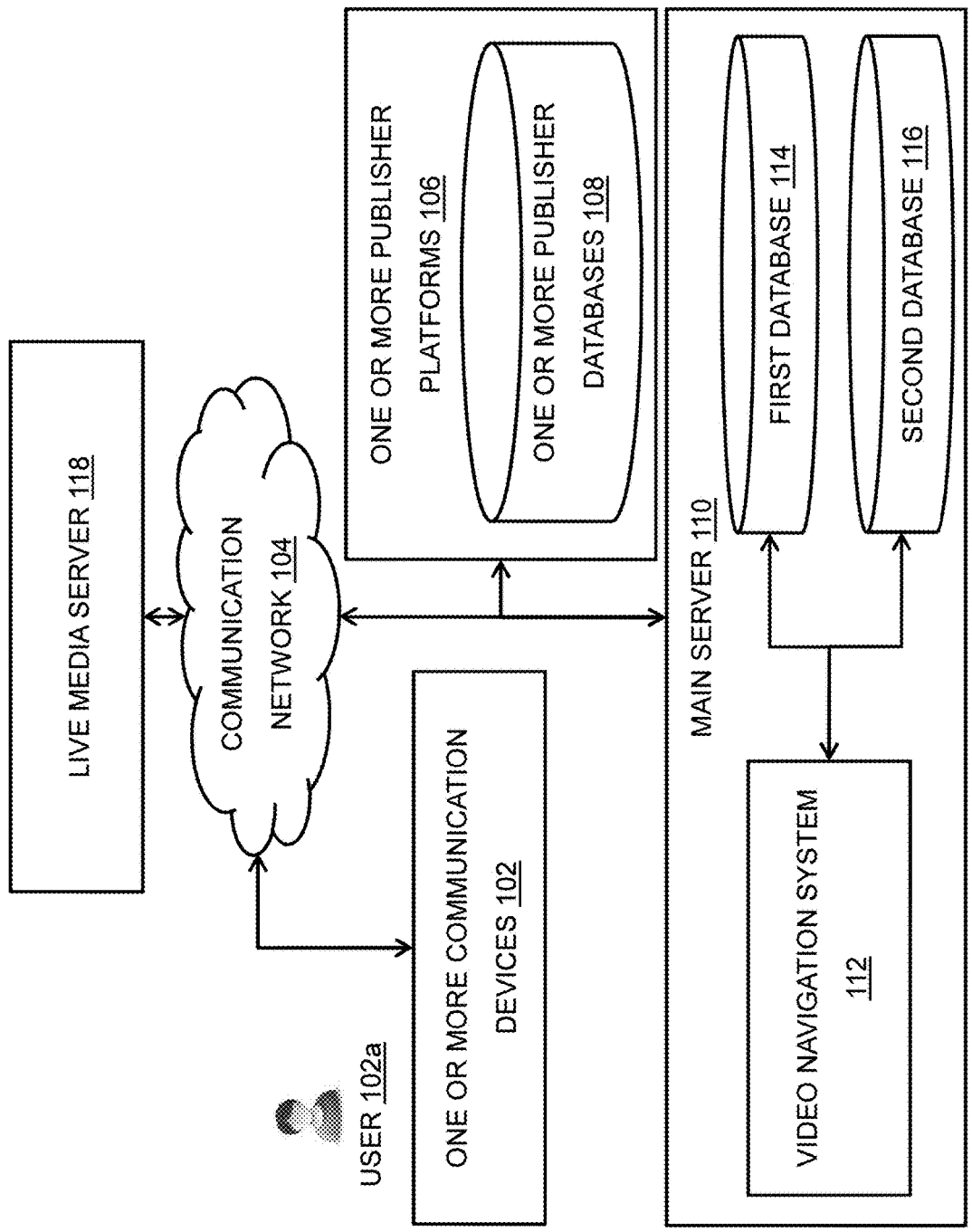
Figure 2:
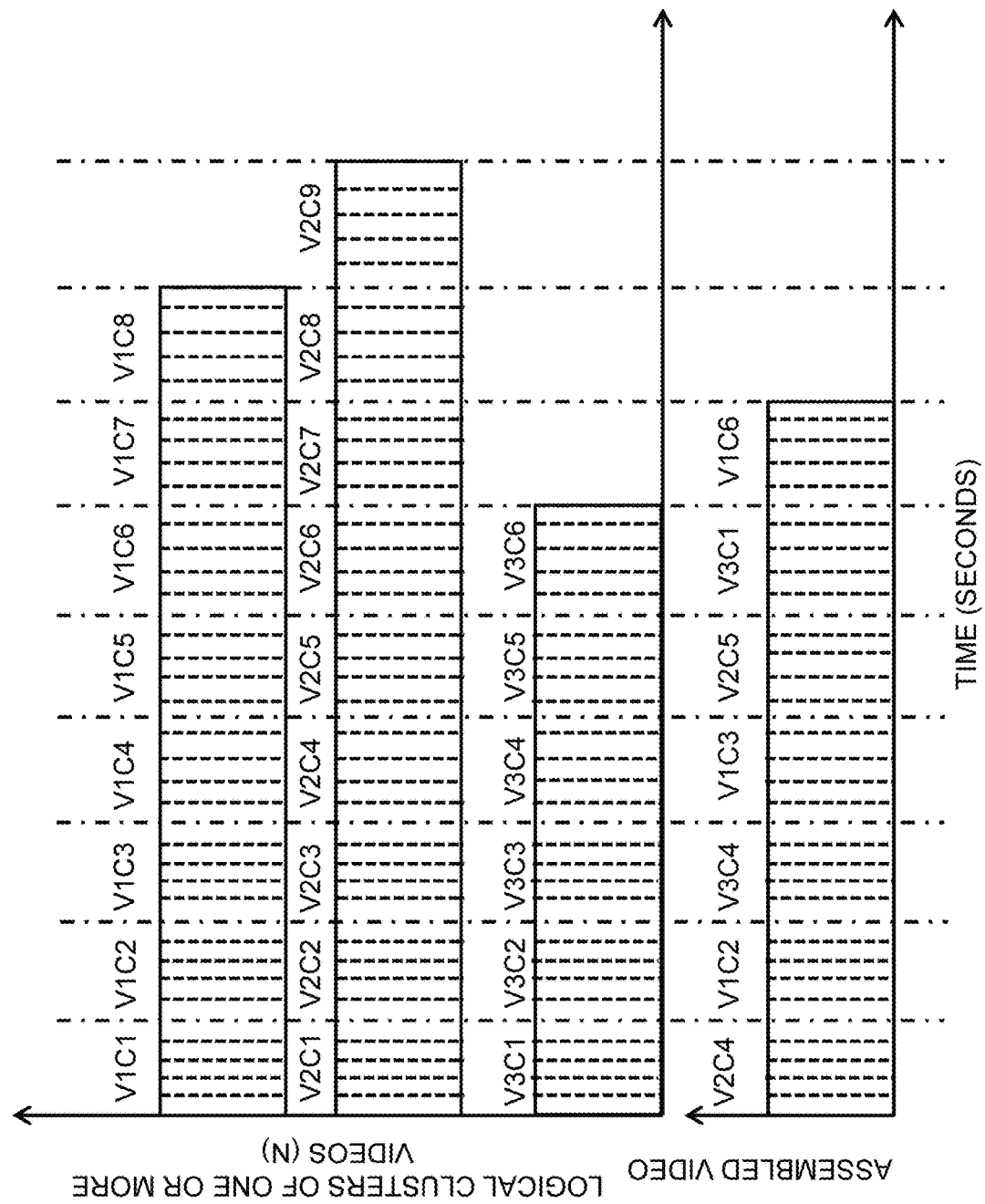
Figure 3:
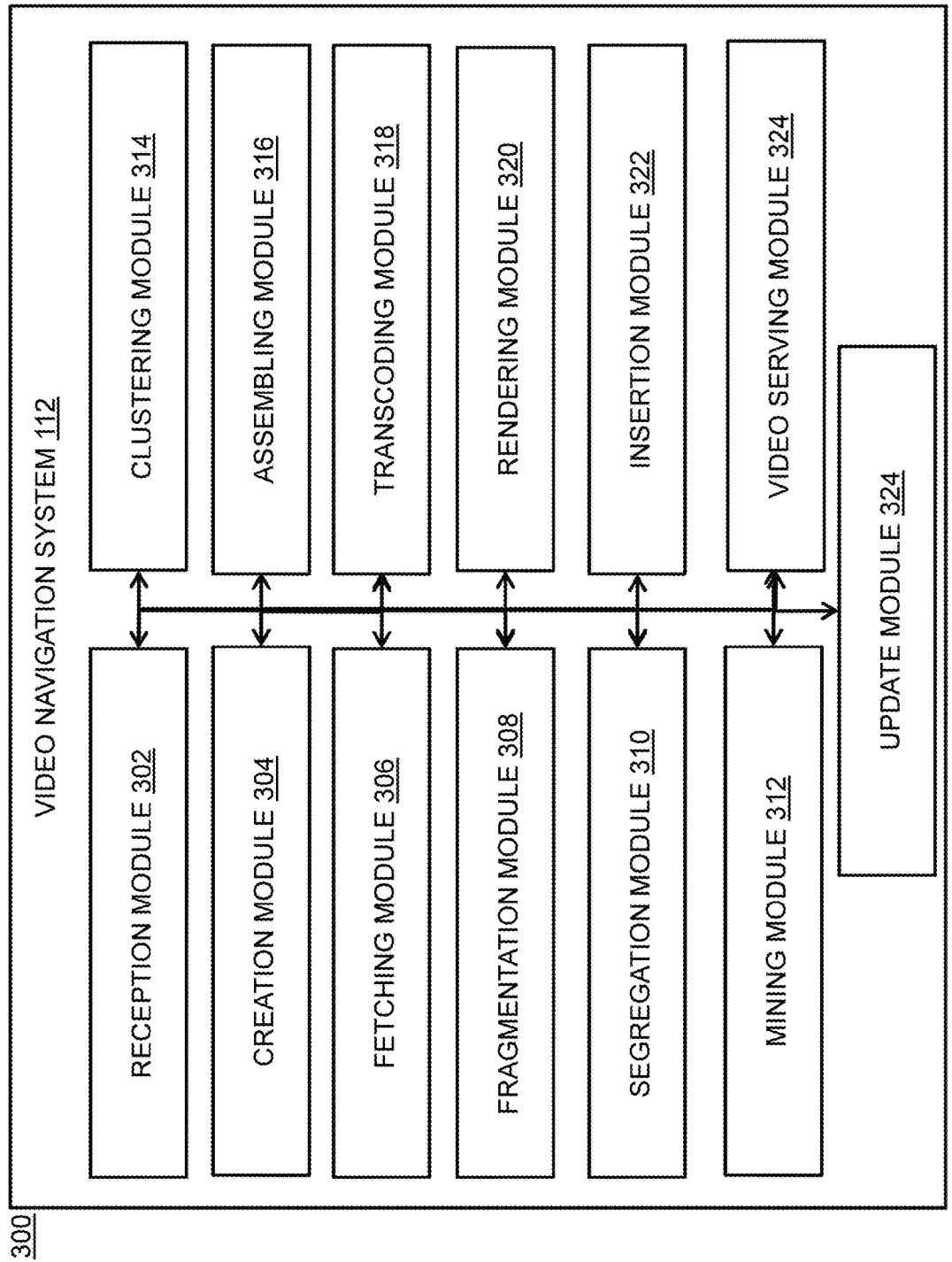
Figure 4A:
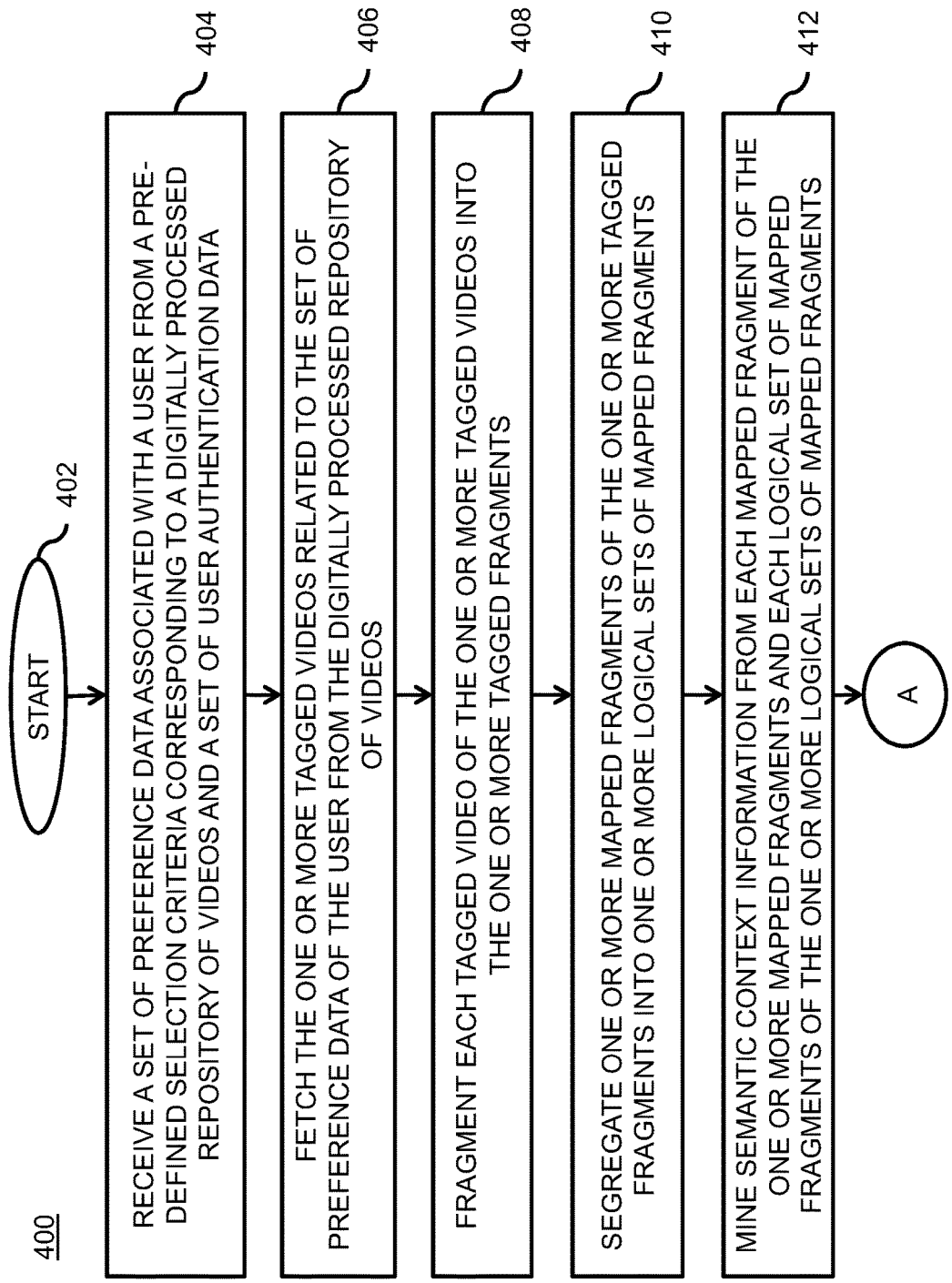

Having thus described the invention in general terms, reference will now be made to the accompanying drawings, which are not necessarily drawn to scale, and wherein:

FIG. 1A illustrates an interaction of a user and one or more publishers with a video navigation system, in accordance with an embodiments of the present disclosure;

FIG. 1B illustrates the interaction of the user with the video navigation system, in accordance with another embodiment of the present disclosure;

FIG. 1C illustrates the interaction of the one or more publishers with the video navigation system, in accordance with yet another embodiment of the present disclosure;

FIG. 1D illustrates the interaction between the user and the one or more publishers associated with the video navigation system, in accordance with yet another embodiment of the present disclosure;

FIG. 1E illustrates the interaction between a live media server and the video navigation system, in accordance with yet another embodiment of the present disclosure;

FIG. 2 illustrates an example of a real time, dynamic, adaptive and non-sequential assembling of one or more tagged clips corresponding to one or more videos;

FIG. 3 illustrates a block diagram of the video navigation system, in accordance with various embodiments of the present disclosure;

FIGS. 4A and 4B illustrate a flow chart for enabling navigation to one or more discrete segments of the real time dynamic and adaptive non-linear, non-sequentially assembled video, in accordance with various embodiments of the present disclosure; and FIG. 5 illustrates a block diagram of a computing device, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

FIG. 1A illustrates an interaction of a user 102a and one or more publishers 106 with a video navigation system 112, in accordance with an embodiments of the present disclosure. The video navigation system 112 interacts with the user 102a by providing navigation options during streaming of an assembled video. Each navigation option is linked to any discrete segment of the assembled video. The video navigation system 112 decides the navigation options based on a set of preference data of the user 102a and a set of video statistics associated with each video segment. In an embodiment of the present disclosure, the user 102a and each of one or more publishers 106 interact with the video navigation system 112 based on a pay per view model. In another embodiment of the present disclosure, the user 102a and each of the one or more publishers 106 interact with the video navigation system 112 based on a subscription based model. The above interaction of the user 102a and the one or more publishers 106 is part of an interactive environment. The interactive environment includes a communication device 102, a communication network 104, the one or more publishers 106 and a main server 110.

The user 102a is associated with the one or more communication devices 102. Each of the one or more communication devices 102 may be any suitable device with at least a display, a storage unit and network connectivity. In an embodiment of the present disclosure, each of the one or more communication devices 102 is a portable communication device. Example of the portable communication device includes a laptop, a smart phone, a tablet and the like. For example, the smartphone may be an Apple smartphone, an Android smartphone, a Windows smartphone and the like. In another embodiment of the present disclosure, each of the one or more communication devices 102 is a fixed communication device. Examples of the fixed communication device include a desktop, a workstation PC and the like. Each of the one or more communication devices 102 runs on an operating system. In general, the operating system provides an interface for the user 102a to interact with hardware of each of the one or more communication devices 102 and other connected devices. In an example, the operating system installed in the one or more communication devices 102 is a Windows based operating system. In another example, the operating system installed in the one or more communication devices 102 is a Mac based operating system. In yet another embodiment of the present disclosure, the operating system installed in the one or more communication devices 102 is a Linux based operating system. In yet another example, the operating system installed in the one or more communication devices 102 is a mobile operating system. Example of the mobile operating system includes but may not be limited to Android operating system, Apple iOS, Symbian based operating system, BADA operating system and blackberry operating system.

The one or more communication devices 102 are connected to the main server 110 through the communication network 104. In general, the communication network 104 is a part of a network layer responsible for connection of two or more communication devices. Further, the communication network 104 may be any type of network. In an embodiment of the present disclosure, the type of communication network 104 is a wireless mobile network. In another embodiment of the present disclosure, the type of communication network 104 is a wired network with a finite bandwidth. In yet another embodiment of the present disclosure, the type of communication network 104 is a combination of the wireless and the wired network for the optimum throughput of data transmission. In yet another embodiment of the present disclosure, the type of communication network 104 is an optical fiber high bandwidth network that enables a high data rate with negligible connection drops.

The communication network 104 includes a set of channels. Each channel of the set of channels supports a finite bandwidth. The finite bandwidth of each channel of the set of channels is based on capacity of the communication network 104. Further, the one or more communication devices 102 possesses a unique machine address (hereinafter "MAC"). The MAC uniquely identifies the identity of each of the one or more communication devices 102 over the communication network 104. In addition, the communication network 104 provides a unique identity to each of the one or more communication devices 102. The unique identity is often referred to as an internet protocol (hereinafter "IP") address. In general, an IP address is a unique string of numbers separated by full stops that identify the one or more communication devices 102 using IP to communicate over the communication network 104. The IP address is characterized by IP versions. In an embodiment of the present disclosure, the IP address assigned to the one or more communication devices 102 is an IPv4 address.

In another embodiment of the present disclosure, the IP address assigned to the one or more communication devices 102 is an IPv6 address.

The one or more communication devices 102 accesses data over the communication network 104 by utilizing one or more applications. The one or more applications include but may not be limited to a web browser, a mobile application, a widget and web applets. In general, each of the one or more applications have a graphical user interface (hereinafter "GUI") that is designed to display and fetch data from the main server 110. In addition, each of the one or more applications on any of the one or more communication devices associated with the user 102a may provide an interface for real time streaming, uploading and downloading of video files and audio files. The web browser installed in the one or more communication devices 102 may be any web browser. Example of the web browsers includes Google Chrome, Mozilla Firefox, Opera, UC Web, Safari, Internet Explorer and the like. In addition, the mobile application installed in at least one of the one or more communication devices 102 may be based on any mobile platform. Examples of the mobile platform include but may not be limited to Android, iOS Mobile, Blackberry and Bada.

Each of the one or more communication devices 102 and the one or more publishers 106 are connected to the main server 110. In an embodiment of the present disclosure, the main server 110 interacts with requests of the one or more communication devices 102 through the communication network 104 (as shown in FIG. 1B). In another embodiment of the present disclosure, the main server 110 interacts with requests of each of the one or more publishers 106 through the communication network 104 (as shown in FIG. 1C). In yet another embodiment of the present disclosure, the main server 110 interacts with request from the one or more publishers 106 that is accessed by each of the one or more communication devices 102 (as shown in FIG. 1D).

Each of the one or more publishers 106 requests for a video tagging and assembling service from the main server 110. Also, the user 102a requests for a video streaming service from the main server 110. In addition, the user 102a and each of the one or more publishers 106 are a requestor of service from the main server 110. Each publisher of the one or more publishers 106 may be any website, web application, mobile application, third party applications and the like. Each publisher may be managed by a media content provider. In an example, XYZ is a news network and a broadcaster of news on television and online platform. The publisher of XYZ news may be a web based platform, mobile app based platform or any individual content provider of media content. In another example, the publisher may be an individual or group providing videos to the video navigation system 112. Each of the one or more publishers 106 may be associated with a publisher database of the one or more publisher databases 108. Each publisher database of the one or more publisher databases 108 is a database of a digitally processed repository of videos. Each publisher of the one or more publishers 106 is registered on the main server 110.

The main server 110 provides a platform for video assembling on demand and serving of interactive navigation options to the user 102a and each of the one or more publishers 106. The platform may be a web platform, mobile application platform, mobile web platform and the like. The main server 110 includes the video navigation system 112, a first database 114 and a second database 116. The video navigation system 112 services the request of the user 102a and each of the one or more publishers 106 in the real time. Further, the first database 114 is a proprietary database. The first database 114 includes a set of user authentication data and a user profile associated with the user 102a. Also, the first database 114 includes a set of publisher authentication data and a publisher profile associated with each publisher of the one or more publishers 106. The user 102a is identified uniquely by the set of user authentication data. The set of user authentication data includes an email address of the user 102a, a bio-data of the user 102a, an authentication key, a physical location and a standard time and time zone of login. The bio data of the user 102a may include full name, nickname, chronological age, gender and the like. In an embodiment of the present disclosure, the first database 114 is an encrypted database. In another embodiment of the present disclosure, the first database 114 is an unencrypted database.

Further, the second database 116 is a database of digital processed repository of videos. The second database 116 stores one or more tagged videos. Each tagged video is virtually divisible into one or more tagged fragments. Each tagged video in the second database 116 is associated with a genre and a title. Examples of the genre include but may not be limited to sports, comedy, horror, drama, adventure, science fiction and autobiography. Also, each video may be associated with a popularity index and a number of views. In addition, each video is characterized by a set of technical specifications and non-technical specifications. The set of technical specifications include encoding format, frame rate, bit rate, frame height, frame width, pixel density, video resolution, size of video and the like. Each video may have different set of technical specifications. Each video in the second database 116 may have any encoding format. In an embodiment of the present disclosure, the encoding format is MPEG-4. In another embodiment of the present disclosure, the encoding format is FLV. In yet another embodiment of the present disclosure, the encoding format is AVI. In yet another embodiment of the present disclosure, the encoding format is 3GP. In yet another embodiment of the present disclosure, the encoding format is derived from proprietary codec. Moreover, the set of non-technical specifications include duration of video, a time reference associated with each video, the genre of video and the like.

Each video is tagged with one or more tags of a set of tags. The set of tags may correspond to a context of video, location reference in video, famous persons, events, genres, date, time and the like. In an example, a video of Moto GP race event is divisible into a lap of one or more laps. Each lap corresponds to a relative position of each racer in race chart. Each section may be tagged with the top racer of each lap. In another example, a video of interview of Mike Tyson is divisible into personal life, social life, professional life, struggles, success, events, etc. Each section of the interview of Mike Tyson can be tagged based on context of discussion. In an embodiment of the present disclosure, the second database 116 is updated with the one or more tagged videos from the one or more publishers 106. In another embodiment of the present disclosure, each publisher of the one or more publishers 106 updates the second database 116 with one or more untagged videos. Each video may be tagged with the set of tags and uploaded to the second database 116. Each video may be uploaded to the second database and tagged with the set of tags. The one or more untagged videos may be tagged manually by one or more administrators associated with the video navigation system 112.

The digital repository of videos in the second database 116 is updated with the one or more tagged videos from one or more sources. The one or more sources may include third party video content providers, the one or more publishers 106, the one or more advertisers, one or more sponsors and the like. Each publisher is a platform that uploads tagged videos to the digital repository of videos in the main server 110. The platform of each publisher may include a web based platform, a mobile application based platform, a web application based platform and the like. Additionally, the digital repository of videos may be updated and managed by the platform administrators. In an embodiment of the present disclosure, each video is manually tagged by the one or more administrators. In another embodiment of the present disclosure, the one or more administrators associated with operations of the main server 110 tag each video based on voice instructions. In yet another embodiment of the present disclosure, each video may be tagged based on speech rendering and analysis. In yet another embodiment of the present disclosure, each video is automatically tagged by the video navigation system 112. The automatic tagging of each video is done based on context mining and supervised digital fingerprinting of a set of frames. In yet another embodiment of the present disclosure, each video may be tagged by proprietary software and algorithms. In yet another embodiment of the present disclosure, each video may be tagged by the user 102a registered on the main server 110 and the publisher of the one or more publishers 106. In addition, each video may be tagged by media agency, advertiser, creative agency and the like. Each tag of the set of tags may be rated for ranking each tag and improving search efficiency.

Going further, the set of tags for each video may be updated based on real time determination of frequently used tags, frequently searched tags and less used tags. In addition, the set of tags for each video may be updated based on dynamic meta-tagging. The set of tags for each video may be updated based on incremental machine learning on the set of tags and the metadata for each tagged video. In an embodiment of the present disclosure, the metadata and meta-tagging for each tagged video may performed according to MPEG 7 standard. The MPEG 7 standard is also called as Multimedia Content Description Interface. For example, a video on Sachin may be tagged with Sachin, Master blaster, legend, god of cricket, and the like. The video navigation system 112 may determine the most used keyword to refer to content on Sachin. Let us suppose, in due course of 1 year, the video navigation system 112 determines that Sachin is frequently searched with "King of Cricket" tag. The video navigation system 112 updates the database of the set of tags associated with Sachin. In addition, the tags will be associated with any other video currently discussed in the public domain. If the name of Sachin surfaces in any new content related to any award show, then the tags will be automatically attached with the award show video too. The video navigation system 112 may present a Gantt chart of set of tags that are temporally classified based on occurrences within search queries and preferences of the users.

The updated set of tags may be determined based on feature detection and correlation in a specific quadrant of one or more frames of the tagged videos. For example, a 10 minute tagged video having a frame rate of 30 fps may be processed by selecting 1 key frame per second and performing feature detection. The feature detection may be based on incremental machine learning. Examples of the feature detection includes but may not be limited to face detection, object detection, motion detection, text detection, moving object detection and the like.

The main server 110 provides the platform to the user 102a and each of the one or more publishers 106. The platform may correspond any one of the website, mobile application, web application, mobile browser based platform. In an embodiment of the present disclosure, the platform is a subscription based paid platform. In another embodiment of the present disclosure, the platform is a pay per view based paid platform. In yet another embodiment of the present disclosure, the platform is a free access, single registration and login based platform. The platform provides a video on demand service. Further, the platform includes but may not be limited to a media player, a list of thumbnails of the one or more tagged videos, recommendation panel, account panel, search panel, preference panel and navigation panes. The pre-defined selection criteria includes but may not be limited to a set of intervals of video broadcast, a physical location of the user 102a, an identified name of celebrity and categories of video. The pre-defined selection criteria are based on dates, time zones, days, seasons, physical locations, occasions, identified names, video genres and the like. The set of intervals of video broadcast corresponds to a time reference in the video. For example, the user 102a may be provided with criteria to view all the news aired between 4:00 PM to 4:15 PM of a specific day. In an example, the physical location may be used to narrow down content relevant to the physical location. The user 102a may like to watch videos relevant to the physical location. The physical location may be derived through many techniques. In an embodiment of the present disclosure, the physical location is derived from the global positioning system (hereinafter "GPS") module present in at least one of the one or more communication devices 102 associated with the user 102a. In another embodiment of the present disclosure, the physical location is derived from manual selection of the physical location from a pre-defined list of locations by the user 102a. In yet another embodiment of the present disclosure, the physical location is derived from internet service provider's server's location.

In an example, a video of Moto GP race event is virtually divisible into a lap segment of one or more laps segments in temporary memory of the main server 110. Each lap segment corresponds to a relative position of each biker in race chart. Each section may be tagged with the top racer of each lap. In another example, a video of interview of Mike Tyson is virtually divisible into corresponding personal life segment, social life segment, professional life segment, struggles segment, success segment, events segment and the like. Each section of the interview of Mike Tyson can be tagged based on context of the interview.

The user 102a enters corresponding set of authentication data through the one or more communication devices 102. The user 102a provides a set of preference data to the main server 110 through the communication network 104. The set of preference data is a subset of the pre-defined selection criteria provided to the user 102a. Further, the video navigation system 112 is configured to receive the set of preference data and fetch the one or more tagged videos related the set of preference data of the user 102a from the second database 116. In addition, the video navigation system 112 is configured to virtually fragment and segregate the one or more tagged videos. In addition, the video navigation system 112 is configured to virtually assemble and transcode logical clusters of mapped fragments of the one or more tagged videos to obtain the assembled video. Further, the video navigation system 112 is configured to render each assembled video into a pre-defined format, insert one or more interactive navigation options and serve the assembled video to the user 102a.

The video navigation system 112 receives the set of preference data associated with the user 102a from the pre-defined selection criteria. The set of preference data corresponds to the digitally processed repository of videos. In addition, the video navigation system 112 receives the set of user authentication data. The video navigation system 112 compares the set of authentication data corresponding to the user with corresponding set of authentication data in the first database 114. The video navigation system 112 allows for login based on a positive comparison of received set of authentication data with the set of the user authentication data present in the first database 114. In an embodiment of the present disclosure, the video navigation system 112 automatically handles content management associated with the set of preference data and the set of user authentication data. In another embodiment of the present disclosure, the content management associated with the set of preference data of the user 102a and the set of user authentication data is manually handled by one or more administrators. Each of the one or more administrators handles the content management by utilizing a content management tool. The content management corresponds to management of the user profile, streaming of the assembled video, editing and updating pre-defined selection criteria, editing pages in the user interface and the like.

The video navigation system 112 creates the user profile based on a received set of user authentication data, the set of preference data and the real time viewing and selection behavior of the user 102a. The real time viewing and selection behavior corresponds to dynamic variation in the preferences of the user 102a during due course of one or more active sessions of user on the video assembling and video navigation platform. In an embodiment of the present disclosure, the user profile is created based on a request from the user 102a. In another embodiment of the present disclosure, the user profile is created automatically by the video navigation system 112. The set of authentication data of the user 102a is stored in the user profile present in the first database 114. Furthermore, the video navigation system 112 fetches the one or more videos related to the set of preference data of the user 102a from the digitally processed repository of videos present in the second database 116. The video navigation system 112 fetches the one or more tagged videos based on a correlation of the set of tags associated with each tagged video of the one or more tagged videos with the set of preference data associated with the user 102a.

The video navigation system 112 virtually fragments each tagged video of the one or more tagged videos into the one or more tagged fragments. Each tagged video is fragmented into the one or more tagged fragments and each tagged fragment is characterized by length measured in a pre-determined interval of time. For example, the pre-determined interval of time is 5 seconds for each tagged fragment of a 300 seconds video. In an embodiment of the present disclosure, the pre-determined interval of time for each tagged fragment may be manually adjusted by the one or more administrators. In another embodiment of the present disclosure, the pre-determined interval of time for each tagged fragment may be automatically adjusted by the video navigation system 112 based on proprietary algorithms. Each tagged video is fragmented based on segmentation of the tagged video for each pre-determined interval of time. Also, the fragmentation of each tagged video is a virtual fragmentation in temporary memory of the main server 110.

The video navigation system 112 virtually segregates one or more mapped fragments of the one or more tagged fragments into one or more logical sets of mapped fragments. In an embodiment of the present disclosure, the one or more mapped fragments are segregated based on a positive mapping of keywords from the set of preference data with the set of tags. The set of tags are associated with each tagged fragment of the one or more tagged fragments. In addition, each tagged videos of the one or more tagged videos in the second database 116 is associated with a set of metadata. In another embodiment of the present disclosure, the one or more mapped fragments are segregated based on the positive mapping of the keywords from the set of preference data with the set of metadata. Each logical set of mapped fragments may correspond to a common tag from each tagged video of the one or more tagged videos.

For example, a user, say ABC provides preferences like Comedy, Jim Carrey and funny to the video navigation system 112. The video navigation system 112 fetches one or more tagged videos related to Jim Carrey, Comedy and funny preferences. The video navigation system fragments each of the one or more videos into tagged fragments. Each tagged fragment may be of 5 second duration. The video navigation system 112 may segregate the mapped fragments from the tagged fragments based on a positive mapping with the set of preference data of the user ABC.

The video navigation system 112 mines semantic context information from each mapped fragment of the one or more mapped fragments. In addition, the video navigation system 112 mines semantic context information from each logical set of mapped fragments of the one or more logical sets of mapped fragments. The semantic context information includes object specific context information and scene specific context information of each mapped fragment and each logical set of mapped fragments. For example, the one or more mapped fragments may be associated with common tags of comedy, movie, Hollywood and Jim Carrey. The video navigation system 112 mines semantic context information that includes dialogues, music, location, faces and the like. The video navigation system 112 may mine sentiments of characters in each mapped fragment from feature analysis of audio and faces. The video navigation system 112 may mine features that include geometrical shapes, color saturation, motion of objects, scene changes, number of scenes, animations and the like.

Going further, the video navigation system 112 virtually clusters the one or more logical sets of mapped fragments into one or more logical clusters of mapped fragments. Each logical cluster of mapped fragments is derived from at least one of the one or more logical sets of mapped fragments. For example, the video navigation system 112 fetches three tagged comedy videos of Jim Carrey. The video navigation system 112 fragments each of the three tagged comedy videos of Jim Carrey. The mapped fragments out of tagged fragments for each tagged video may be segregated into the logical set of mapped fragments. The mapped fragments for action and comedy tags in the three videos may be segregated to obtain the logical set of mapped fragments. The logical set of mapped fragments for comedy and action tags for each tagged video may be clustered in the logical cluster.

The video navigation system 112 performs auto volume leveling on each audio segment associated with the one or more mapped fragments or logical clusters of the mapped fragments. For example, the first logical cluster may contain fragments having different volume levels. The video navigation system 112 may dynamically normalize volume levels on a uniform scale. In addition, the video navigation system 112 may perform image normalization on each frame of the mapped fragments.

In an embodiment of the present disclosure, the video navigation system 112 virtually assembles at least one of the one or more logical clusters of mapped fragments in a pre-defined order of preference to obtain an assembled video. Each logical cluster of mapped fragments is assembled based on an analysis of the set of preference data of the user and the semantic context information. For example, the user may provide preferences like adventure, Nicholas Cage, movie and fighting scenes. The one or more tagged video with tags of adventure and Nicholas Cage and movie may be tagged with specific fighting scenes. The video navigation system 112 mines semantic context information from each tagged video through searching for fights related keywords from rendered speeches, scene detection, object movement, music, speech analysis, tone analysis and the like. The semantic context information may be used to automatically tag, fragment, cluster or assemble videos on demand.

The video navigation system 112 removes duplicate tags from set of tags of the real time and dynamically assembled video in the temporary memory of the main server 110. The duplicate tags along the set of metadata of the assembled video are flushed in the disk for faster transmission and caching of the assembled video on different communication devices.

In an embodiment of the present disclosure, the pre-defined order of preference is derived from the set of preference data, the user profile and the semantic context information mined from the activities of user 102a. In another embodiment of the present disclosure, the pre-defined order of preference is derived from preferences of users with similar user profiles and situations. In another embodiment of the present disclosure, the video navigation system 112 virtually assembles at least one of the one or more logical clusters of mapped fragments in a dynamically generated pre-defined order of preference. The dynamically generated pre-defined order of preference is based on a real time viewing and selection behavior of the user 102a. In an embodiment of the present disclosure, the pre-defined order of preference corresponds to a linear and non-sequential assembling of the one or more logical set of mapped fragments. In another embodiment of the present disclosure, the pre-defined order of preference corresponds to a non-linear and non-sequential assembling of the one or more logical set of mapped fragments. Each logical set of mapped fragments is a virtually clustered in the temporary memory of the main server 110. The video navigation system 112 presents a personalized video solution for each user 102a.

In an example, a person, say X selects tags corresponding to sports. The person (X) selects tags corresponding to Mike Tyson and boxing. In addition, the person selects the knockout tag from the pre-defined selection criteria. The knockout moment is often an ending portion of a boxing match. The video navigation system 112 fetches the one or more tagged videos associated to matches of Mike Tyson. The video navigation system 112 searches for a knockout tag in at least one of the one or more pre-defined sections of each tagged video. The video navigation system 112 fragments each tagged video of Mike Tyson into tagged fragments and segregates logical set of mapped fragments for knockout by Mike Tyson tag from other tagged clips of Mike Tyson. The video navigation system 112 may cluster each logical set of mapped fragments to obtain logical clusters of mapped fragments. The logical clusters may be assembled in the real time to obtain the assembled video. In addition, the video navigation system 112 may assemble each logical cluster or mapped fragments for the knockout by Mike Tyson based on number of views. The video navigation system 112 inserts the interactive navigation option to select knockout of Mike Tyson in 2002. The video navigation system 112 dynamically serves a reassembled video to the person (X) in the real time upon a click on the inserted navigation option. The video navigation system 112 dynamically serves a reassembled video to the user 102a in the real time upon a click on any video recommendations or the interactive navigation option. The video navigation system 112 dynamically reassembles the one or more mapped fragments or logical clusters of mapped fragments in the real time.

The user 102a may request to stream the assembled video that includes specific segments of 360° videos (or immersive videos), the tagged set of videos and a live video (as shown in FIG. 1E). The main server 110 is associated with a live media server 118. The live media server 118 is a high bandwidth media server that is configured to stream live videos to each communication device of the one or more communication devices 102. The video navigation system 112 virtually fetches and segregates the one or more mapped fragments of the 360° videos and the one or more tagged videos. The mapped fragments of 360° videos and mapped fragments of tagged videos are derived from comparison of the keywords from the set of preference data with tags of the 360° videos and traditional videos. In addition, the video navigation system 112 requests a live media server 118 for live streaming of the live video. The video navigation system virtually assembles the mapped fragments of 360° videos and mapped fragments of videos. The video navigation system 112 streams the virtually assembled mapped fragments of 360° videos and the mapped fragments of videos. In addition, the video navigation system 112 switches from the assembled content to the live video received from the live media server in the real time.

The video navigation system 112 transcodes the assembled video into a pre-defined video format by utilizing a codec. The assembled video is transcoded to enable adaptive bitrate streaming on each communication device of the one or more communication devices 102. The assembled video is transcoded based on one or more device parameters and one or more network parameters. The one or more device parameters include screen size, screen resolution, pixel density and the like. Further, the one or more network parameters include an IP address, network bandwidth, maximum bitrate support over network, throughput, connection strength, location of requesting server and the like. In an example, the user 102a may be using a laptop with a limited bandwidth insufficient for high definition streaming of videos. Accordingly, the video navigation system 112 transcodes the assembled video in format up-loadable from the main server 110. In another example, the user 102a may be using a smartphone with a low bandwidth and a lower display resolution. Accordingly, the video navigation system 112 transcodes the assembled video in the format viewable for the lower display resolution screens. Further, the video navigation system 112 utilizes salt stack to scale up and down transcoding requirements. The salt stack utilizes shell scripts to execute FFMPEG in the main server 110.

In an embodiment of the present disclosure, the video navigation system 112 transcodes the assembled video in 144 p quality. In another embodiment of the present disclosure, the video navigation system 112 transcodes the assembled video in 240 p quality. In yet another embodiment of the present disclosure, the video navigation system 112 transcodes the assembled video in 360 p quality. In yet another embodiment of the present disclosure, the video navigation system 112 transcodes the assembled video in 480 p quality. In yet another embodiment of the present disclosure, the video navigation system 112 transcodes the assembled video in 720 p quality. In yet another embodiment of the present disclosure, the video navigation system 112 transcodes the video in 1080 p quality. In yet another embodiment of the present disclosure, the video navigation system 112 transcodes the assembled video in any standard quality.

In addition, the video navigation system 112 trans-rates and trans-sizes the assembled video to enable adaptive streaming for each communication device of the one or more communication devices 102. The video navigation system 112 transcodes the assembled in any standard video coding format, container and audio coding format. Examples of the video coding format includes but may not be limited to MPEG-2 Part 2, MPEG-4 Part 2, H.264 (MPEG-4 Part 10), HEVC, Theora, Real Video RV40, VP9, and AV1. Examples of the container includes but may not be limited to Matroska, FLV, MPEG-4 part 12, VOB, HTML and real media. Example of the audio coding format includes but may not be limited to MP3, AAC, Vorbis, FLAC, and Opus. In an embodiment of the present disclosure, the assembled video is in the MP4 file format. In another embodiment of the present disclosure, the assembled video in the matroska file format. In yet another embodiment of the present disclosure, the assembled video is in the AVI file format. In yet another embodiment of the present disclosure, the assembled video is in the FLV file format. In yet another embodiment of the present disclosure, the assembled video is in the 3GP file format.

The assembled video is transcoded based on an audio codec and a video codec. The audio codec and the video codec may be any generic or proprietary codec. Example of the video codecs include but may not be limited to H.265/MPEG-H HEVC codec, H.264/MPEG-4 AVC codec, H.263/MPEG-4 codec, H.263/MPEG-4 Part 2 codec, H.262/MPEG-2 codec and ACT-L3 codec. The compression performed by the video codecs on the assembled video is a lossy compression. In addition, the video navigation system 112 utilizes a media streaming communication protocol to stream the real time and dynamically assembled video on each of the one or more communication devices 102. In an embodiment of the present disclosure, the media streaming communication protocol is a HTTP live streaming (hereinafter "HLS") protocol. In another embodiment of the present disclosure, the media streaming communication protocol is a MPEG based dynamic adaptive streaming over HTTP (hereinafter "MPEG-DASH") protocol.

The video navigation system 112 renders the assembled video for addition of one or more interactive elements and a bi-directional flow. The one or more interactive elements include forward playback, reverse playback, fast playback and slow playback. In addition, the one or more interactive elements include touch based navigation option, swipe based navigation option, click based navigation option, voice based navigation and motion based navigation option and the like.

The video navigation system 112 analyses the set of preference data associated with the user 102a. In addition, the video navigation system 112 analyses fetched one or more videos corresponding to the set of preference data and a past set of preference data associated with the user 102a. The analysis of the set of preference data, the fetched one or more videos and the past set of preference data is performed to map user interests.

Further, the video navigation system 112 inserts one or more interactive navigation options in the one or more regions of the platform of the main server 110. The one or more interactive navigation options are inserted based on the set of preference data of the user 102a, the semantic context information and the real time user viewing and selection behavior. The real time viewing and selection behavior corresponds to dynamic variation in the preferences of the user during due course of one or more active sessions of user on the video assembling and interactive navigation platform. Further, the semantic context information is derived from mining data from each mapped fragment and each logical cluster of mapped fragments. Also, the insertion of the one or more navigation options is based a set of video statistics associated with each fetched video of the one or more videos. The set of video statistics includes number of views, popularity index and number of likes, number of shares, number of comments and number of ratings. The one or more regions includes one or more banner slots, one or more slots between the assembled video and one or more overlay regions covering a pre-defined area of corresponding frames of the assembled video. The one or more regions for the insertion of the one or more interactive navigation options are determined by at least one of the one or more publishers 106 and the one or more administrators. The one or more interactive navigation options include one or more queries based option for navigation to a discrete segment of the assembled video. Further, the one or more interactive navigation options include one or more thumbnail based bi-directional option of navigation to the discrete segment of the assembled video. Also, the one or more interactive navigation options include one or more ratings based option of navigation to the discrete segment of the assembled video. The one or more interactive video navigation options may be activated or enabled through any user input. Examples of the user inputs include but may not be limited to a haptic input, a tilt of device, touch, click, swipe, pronouncing the interactive keywords displayed over the video and shake. For example, the platform may display an interactive option to shake the device for switching to song of X and Y. The one or more interactive navigation options may be linked with a specific assembled video. The video navigation system 112 receives user interaction on the one or more navigation options and switches the current assembled video with the assembled video linked with the navigation options.

The video navigation system 112 serves the assembled video and inserted one or more interactive navigation options to the user 102a. The one or more interactive navigation options are presented based on at least one type of presentation options of pre-defined types of presentation options. The pre-defined types of presentation options include one or more graphical presentations, one or more textual presentations; one or more thumbnails corresponding to the mapped one or more clips and one or more animations. The one or more interactive navigation options are presented for enabling the user 102a to navigate to one or more discrete segments of the assembled video.

Further, the video navigation system 112 updates the user profile corresponding to the user 102a based on variation in the set of preference data in the first database 114. In addition, the video navigation system 112 updates the assembled video in the curated repository of videos in the real time. In an example, the assembled video may be recommended to any other user having a similar user profile.

It may be noted that in FIG. 1A, FIG. 1B, FIG. 1C and FIG. 1D, the communication device 102 corresponding to the user 102a is connected to the main server 110; however, those skilled in the art would appreciate that more number of communication devices associated with more number of users is connected to the main server 110. It may be noted that in FIG. 1A, FIG. 1B, FIG. 1C and FIG. 1D, the main server 110 is the provider of video assembling and video navigation service; however, those skilled in the art would appreciate that more number of main servers synchronously provide video assembling and video navigation services. It may be noted that in FIG. 1A, FIG. 1B, FIG. 1C and FIG. 1D, the communication device 102 associated with the user 102a is connected to the main server 110 through the communication network 104; however, those skilled in the art would appreciate that more number of communication devices associated with more number of users is connected to more number of main servers through more number of communication networks.

FIG. 2 illustrates an example of the real time, dynamic, adaptive and non-sequential assembling of the one or more mapped fragments of the one or more tagged videos. In the example, the one or more tagged videos include a first video (V1), a second video (V2) and a third video (V3). The video navigation system 112 receives the request of service from the user 102a through the communication network 104. The user 102a provides the set of preference data and the set of authentication data to the video navigation system 112. The video navigation system 112 fetches the first video (V1), the second video (V2) and the third video (V3) from the second database 116. In addition, the one or more pre-defined sections of the first video (V1), the second video (V2) and the third video (V3) are tagged with the set of tags. The video navigation system 112 fragments and logically clusters the first video (V1) into a first logical cluster (V1C1), a second logical cluster (V1C2), a third logical cluster (V1C3), a fourth logical cluster (V1C4), a fifth logical cluster (V1C5) and a sixth logical cluster (V1C6). In addition, the video navigation system fragments and logically clusters a seventh logical cluster (V1C7) and an eighth logical cluster (V1C8). Accordingly, the video navigation system 112 fragments and logically clusters the second video (V2) into a first logical cluster (V2C1), a second logical cluster (V2C2) and a third logical cluster (V2C3). The video navigation system 112 clusters a fourth logical cluster (V2C4), a fifth logical cluster (V2C5) and a sixth logical cluster (V2C6). In addition, the video navigation system 112 clusters a seventh logical cluster (V2C7), an eighth logical cluster (V2C8) and a ninth logical cluster (V2C9). The video navigation system performs similar operations on the third video (V3). The fragmentation of the first video (V1), the second video (V2) and third video (V3) is done for a pre-determined interval of time. The first set of logical clusters (V1C1-V1C8), the second set of logical clusters (V2C1-V2C9) and the third set of logical clusters (V3C1-V3C6) includes 8, 9 and 6 logical clusters of fragments respectively.

The video navigation system 112 non-linearly and non-sequentially assembles the fourth logical cluster (V2C4), the second logical cluster (V1C2), the fourth logical cluster (V3C4) and the third logical cluster (V1C3). In addition, the video navigation system assembles the fifth logical cluster (V2C5), the first logical cluster (V3C1) and the sixth logical cluster (V1C6) to obtain the assembled video. The pre-defined order of preference of corresponding clips is derived from the set of the preference data of the user 102*a* and the user profile corresponding to the user 102*a*. The assembled video is transcoded into the pre-defined format by the video navigation system 112. The assembled video in transcoded format is streamed to the user 102*a* in the real time.

FIG. 3 illustrates a block diagram 300 of the video navigation system 112, in accordance with various embodiments of the present disclosure. It may be noted that to explain the system elements of FIG. 3, references will be made to elements of the FIG. 1A. The video navigation system 112 receives fetches, fragments, segregates, clusters and assembles logical sets of mapped fragments of the one or more mapped fragments in the pre-defined order of preference. In addition, the video navigation system 112 mines semantic context information and inserts the one or more interactive navigation options in the real time. Further, the video navigation system 112 includes a reception module 302, a creation module 304, a fetching module 306, a fragmentation module 308 and a segregation module 310. Further, the video navigation system 112 includes a mining module 312, a clustering module 314, an assembling module 316, a transcoding module 318 and a rendering module 320. In addition, the video navigation system includes an insertion module 322, a video serving module 324 and an update module 326.

The reception module 302 receives the set of preference data associated with the user 102*a*. The reception module 302 receives the set of preference data from the pre-defined selection criteria. The pre-defined selection criteria are related to the digitally processed repository of videos (as discussed above in the detailed description of FIG. 1A). Further, the creation module 304 creates the user profile based on the received set of user authentication data and the set of preference data (as described above in the detailed description of FIG. 1A).

The fetching module 306 fetches the one or more tagged videos based on the set of preference data of the user 102*a* from the digitally processed repository of videos. The fetching module 306 fetches the one or more videos based on the correlation of the set of tags with the set of preference data associated with the user 102*a* (as discussed above in the detailed description of FIG. 1A). Further, the fragmentation module 308 fragments each tagged video of the one or more tagged videos into the one or more tagged fragments. Each tagged video is fragmented into the one or more tagged fragments and each tagged fragment is characterized by a pre-determined interval of time. Each tagged video is fragmented based on segmentation of the tagged video for each pre-determined interval of time (as discussed above in the detailed description of FIG. 1A).

Going further, the segregation module 310 segregates one or more mapped fragments of the one or more tagged fragments into one or more logical sets of mapped fragments. The segregation module 310 segregates the one or more mapped fragments based on a positive mapping of keywords from the set of preference data with the set of tags associated with each tagged fragment of the one or more tagged fragments (as described above in the detailed description of FIG. 1A). The mining module 312 mines semantic context information from each mapped fragment of the one or more mapped fragments and each logical set of mapped fragments of the one or more logical sets of mapped fragments. The semantic context information includes an object specific context information and scene specific context information of each mapped fragment and each logical set of mapped fragments (as discussed in detailed description of FIG. 1A). Further, the clustering module 314 clusters the one or more logical sets of mapped fragments into the one or more logical clusters of mapped fragments (as discussed above in the detailed description of FIG. 1A).

Further, the assembling module 316 assembles at least one of the one or more logical clusters of mapped fragments in the pre-defined order of preference to obtain the assembled video. Each logical cluster of mapped fragments is assembled based on the analysis of the set of preference data of the user and the semantic context information (as discussed in detailed description of FIG. 1A). The transcoding module 318 transcodes the assembled video into a pre-defined video format. The transcoding module 318 utilizes a codec. The codec may be any standard codec or proprietary codec. The transcoding module transcodes the assembled video to enable adaptive bitrate streaming on each of the one or more communication devices 102. The adaptive bitrate streaming is based on one or more device parameters and one or more network parameters (as discussed above in the detailed description of FIG. 1A). The rendering module 320 renders the assembled video for addition of one or more interactive elements and a bi-directional flow (as discussed above in the detailed description of FIG. 1A). The insertion module 322 inserts the one or more interactive navigation options in the corresponding one or more regions. The one or more navigation options are inserted based on the set of preference data of the user 102*a* and the semantic context information of the one or more tagged videos (as discussed in the detailed description of FIG. 1A).

In addition, the video serving module 324 serves the assembled video and inserted one or more interactive navigation options to the user 102*a*. The one or more interactive navigation options are presented as at least one type of presentation options of the pre-defined types of presentation options (as discussed in the detailed description of FIG. 1A). Furthermore, the update module 326 updates the user profile corresponding to the user 102*a*. The update module 326 updates the user profile based on the variation in the set of preference data. The assembled video is updated in the digitally processed repository of videos in the real time (as discussed above in the detailed description of FIG. 1A).

FIGS. 4A and 4B illustrate a flow chart 400 for enabling navigation to the one or more discrete segments of the real time dynamic and adaptive non-linear, non-sequentially assembled video, in accordance with various embodiments of the present disclosure. It may be noted that to explain the process steps of flowchart 400, references will be made to the system elements of the FIG. 1A, FIG. 1B, FIG. 1C, FIG. 1D, FIG. 1E and the FIG. 3. It may also be noted that the flowchart 400 may have lesser or more number of steps.

The flowchart 400 initiates at step 402. Following step 402, at step 404, the reception module 302 receives the set of preference data associated with the user 102*a*. The reception module 302 receives the set of preference data from the pre-defined selection criteria. The pre-defined selection criteria are related to the digitally processed repository of videos. Further, at step 406, the fetching module 306 fetches the one or more tagged videos based on the set of preference data of the user 102*a* from the digitally processed repository of videos. The fetching module 306 fetches the one or more videos based on the correlation of the set of tags with the set of preference data associated with the user 102*a*. Furthermore, at step 408, the fragmentation module 308 fragments each tagged video of the one or more tagged videos into the one or more tagged fragments. Each tagged video is fragmented into the one or more tagged fragments and each tagged fragment is characterized by a pre-determined interval of time. At step 410, the segregation module 310 segregates the one or more mapped fragments of the one or more tagged fragments into one or more logical sets of mapped fragments. The segregation module 310 segregates the one or more mapped fragments based on the positive mapping of keywords from the set of preference data with the set of tags associated with each tagged fragment of the one or more tagged fragments. At step 412, the mining module 312 mines semantic context information from each mapped fragment of the one or more mapped fragments and each logical set of mapped fragments of the one or more logical sets of mapped fragments. The semantic context information includes an object specific context information and scene specific context information of each mapped fragment and each logical set of mapped fragments. At step 414, the clustering module 314 clusters the one or more logical sets of mapped fragments into the one or more logical clusters of mapped fragments.

Further, at step 416, the assembling module 316 assembles at least one of the one or more logical clusters of mapped fragments in the pre-defined order of preference to obtain the assembled video. Each logical cluster of mapped fragments is assembled based on the analysis of the set of preference data of the user and the semantic context information. At step, 418, the insertion module 322 inserts the one or more interactive navigation options in the one or more regions of the video navigation platform. The one or more navigation options are inserted based on the set of preference data of the user and the semantic context information. At step 420, the video serving module 324 serves the assembled video and inserted one or more interactive navigation options to the user 102*a*. The one or more interactive navigation options are presented as at least one type of presentation options of the pre-defined types of presentation options. The one or more interactive navigation options are presented to enable the user 102*a* to navigate to the one or more discrete segments of the assembled video. The flowchart 400 terminates at step 422.

It may be noted that the flowchart 400 is explained to have above stated process steps; however, those skilled in the art would appreciate that the flowchart 400 may have more/less number of process steps which may enable all the above stated embodiments of the present disclosure.

FIG. 5 illustrates a block diagram of a computing device 500, in accordance with various embodiments of the present disclosure. The computing device 500 includes a bus 502 that directly or indirectly couples the following devices: memory 504, one or more processors 506, one or more presentation components 508, one or more input/output (I/O) ports 510, one or more input/output components 512, and an illustrative power supply 514. The bus 502 represents what may be one or more buses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 5 is merely illustrative of an exemplary computing device 500 that can be used in connection with one or more embodiments of the present invention. Distinction is not made between such categories as "workstation," "server," "laptop," "hand-held device," etc., as all are contemplated within the scope of FIG. 5 and reference to "computing device."

The computing device 500 typically includes a variety of computer-readable media. The computer-readable media can be any available media that can be accessed by the computing device 500 and includes both volatile and non-volatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data. The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 500. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. The memory 504 may be removable, non-removable, or a combination thereof. Exemplary hardware devices include solid-state memory, hard drives, optical-disc drives, etc. The computing device 500 includes one or more processors that read data from various entities such as memory 504 or I/O components 512. The one or more presentation components 508 present data indications to a user or other device. Exemplary presentation components include a display device, speaker, printing component, vibrating component, etc. The one or more I/O ports 510 allow the computing device 500 to be logically coupled to other devices including the one or more I/O components 512, some of which may be built in. Illustrative components include a microphone, joystick, game pad, satellite dish, scanner, printer, wireless device, etc.

The present disclosure has several advantages over the prior art. The present disclosure provides a solution for real time mapping of user preference behavior. The mapping of the user preference behavior facilitates in identifying relevant content for the user. The present disclosure facilitates dynamic clustering of clips corresponding to multiple videos having same tags. Also, the video navigation system dynamically reassembled the clustering of clips in the real time to suit the demand of the user. The assembled video can be navigated bi-directionally and any discrete segment of the video can be selected by the user. The present disclosure provides a method efficient in mining and attaching tags corresponding to multiple sections of the video. The assembled video solves tedious video reediting work of publishers. The present disclosure facilitates a seamless viewing experience bundled with personalized video solution within a single assembled video for the users. The present solution saves the switching and selection and sorting time of user by presenting a seamless single video having multiple segments that are related to the preferences of the user.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed is:

1. A computer-implemented method for enabling navigation to one or more discrete segments of a real time dynamic and adaptive, non-linear and non-sequentially assembled video, the method comprising:

receiving at a video navigation system with a processor, a set of preference data associated with a user from a pre-defined selection criteria and a set of user authentication data, wherein the pre-defined selection criteria corresponds to a digitally processed repository of videos;

fetching at the video navigation system with the processor, one or more tagged videos related to the set of preference data of the user from the digitally processed repository of videos, wherein the one or more tagged videos being fetched based on a correlation of a set of tags associated with each video of the one or more tagged videos with the set of preference data associated with the user;

fragmenting at the video navigation system with the processor, each tagged video of the one or more tagged videos into one or more tagged fragments, wherein each tagged video being fragmented into the one or more tagged fragments, wherein each tagged fragment being characterized by a pre-determined interval of time and wherein each tagged video being fragmented based on segmentation of the tagged video for each pre-determined interval of time;

segregating at the video navigation system with the processor, one or more mapped fragments of the one or more tagged fragments into one or more logical sets of mapped fragments, wherein the one or more mapped fragments being segregated based on a positive mapping of keywords from the set of preference data with the set of tags associated with each tagged fragment of the one or more tagged fragments;

mining at the video navigation system with the processor, semantic context information from each mapped fragment of the one or more mapped fragments and each logical set of mapped fragments of the one or more logical sets of mapped fragments, wherein the semantic context information comprises an object specific context information and scene specific context information of each mapped fragment and each logical set of mapped fragments;

clustering at the video navigation system with the processor, the one or more logical sets of mapped fragments into corresponding one or more logical clusters of mapped fragments;

assembling at the video navigation system with the processor, at least one of the one or more logical clusters of mapped fragments in a pre-defined order of preference to obtain an assembled video, wherein each logical cluster of mapped fragments being clustered based on analysis of the set of preference data of the user and the semantic context information;

inserting at the video navigation system with the processor, one or more interactive navigation options in corresponding one or more regions, wherein the one or more interactive navigation options being inserted based on analysis of the set of preference data of the user, a real time viewing and selection behavior of the user and the semantic context information associated with each tagged video of the one or more tagged videos; and serving at the video navigation system with the processor, the assembled video and the inserted one or more interactive navigation options to the user, wherein the one or more interactive navigation options being presented as at least one type of presentation options of a pre-defined types of presentation options and wherein the one or more interactive navigation options being presented for enabling the user to navigate to the one or more discrete segments of the assembled video.

2. The computer-implemented method as recited in claim 1, further comprising creating at the video navigation system with the processor, a user profile corresponding to the set of user authentication data and the set of preference data, wherein the user profile comprises the set of preference data segregated on a basis of the pre-defined selection criteria, the set of user authentication data, a past set of preference data, a physical location of the user and a bio data of the user and wherein the set of user authentication data comprises an email address, an authentication key, a physical location and a time of request of video.

3. The computer-implemented method as recited in claim 1, further comprising transcoding at the video navigation system with the processor, the assembled video into a pre-defined video format by utilizing a codec, wherein the assembled video being transcoded to enable adaptive bitrate streaming based on one or more device parameters and one or more network parameters, wherein the one or more device parameters comprises screen size, screen resolution and pixel density and wherein the one or more network parameters comprises an IP address, network bandwidth, maximum bitrate support over network, throughput, connection strength and location of requesting server.

4. The computer-implemented method as recited in claim 1, further comprising rendering at the video navigation system with the processor, the assembled video for adding one or more interactive elements and bi-directional flow.

5. The computer-implemented method as recited in claim 1, wherein the pre-defined types of presentation options comprises one or more graphical presentations, one or more textual presentations, one or more thumbnails corresponding to a subsequent mapped one or more clips and one or more animations.

6. The computer-implemented method as recited in claim 1, wherein the one or more regions comprises one or more banner slots, one or more slots between the assembled video and one or more overlay regions covering a pre-defined area of corresponding frames of the assembled video and wherein the one or more regions for the insertion of the one or more interactive navigation options being determined by at least one of one or more publishers and one or more administrators.

7. The computer-implemented method as recited in claim 1, wherein the one or more interactive navigation options comprises one or more queries based option for navigation to a discrete segment of the one or more discrete segments of the assembled video, one or more thumbnail based bi-directional option of navigation to the discrete segment of the assembled video and one or more ratings based option of navigation to the discrete segment of the assembled video.

8. The computer-implemented method as recited in claim 1, further comprising updating at the video navigation system with the processor, the assembled video in the digitally processed repository of videos, the user profile of the user based on variations in the set of preference data, the dynamic set of conditions and the set of user authentication data in a real time.

9. The computer-implemented method as recited in claim 1, wherein the set of user authentication data comprises an email address, the bio-data of the user, an authentication key, a physical location, a standard time and time zone of login.

10. The computer-implemented method as recited in claim 1, wherein the pre-defined selection criteria being based on date, time zone, day, season, physical location, occasion, an identified name and a video genre.

11. The computer-implemented method as recited in claim 1, wherein the pre-defined order of preference being derived from the set of preference data, the semantic context information, the user profile of the user and user profiles of any user having similar preferences.

12. The computer-implemented method as recited in claim 1, wherein each tagged video of the one or more tagged videos being manually tagged by at least one of one or more publishers.

13. The computer-implemented method as recited in claim 1, wherein each tagged video of the one or more tagged videos being manually tagged by at least one of one or more system administrators.

14. The computer-implemented method as recited in claim 1, wherein each tagged video of the one or more tagged videos being tagged based on voice instructions of one or more system administrators.

15. The computer-implemented method as recited in claim 1, wherein each tagged video of the one or more tagged videos being tagged based on mining from audio rendering and analysis.

16. A computer system comprising:
one or more processors; and
a memory coupled to the one or more processors, the memory for storing instructions which, when executed by the one or more processors, cause the one or more processors to perform a method for enabling navigation to one or more discrete segments of a real time dynamic and adaptive non-linear and non-sequentially assembled video, the method comprising:

receiving at a video navigation system, a set of preference data associated with a user from a pre-defined selection criteria and a set of user authentication data, wherein the pre-defined selection criteria corresponds to a digitally processed repository of videos;

fetching at the video navigation system, one or more tagged videos related to the set of preference data of the user from the digitally processed repository of videos, wherein the one or more tagged videos being fetched based on a correlation of a set of tags associated with each video of the one or more tagged videos with the set of preference data associated with the user;

fragmenting at the video navigation system, each tagged video of the one or more tagged videos into one or more tagged fragments, wherein each tagged video being fragmented into the one or more tagged fragments, wherein each tagged fragment being characterized by a pre-determined interval of time and wherein each tagged video being fragmented based on segmentation of the tagged video for each pre-determined interval of time;

segregating at the video navigation system, one or more mapped fragments of the one or more tagged fragments into one or more logical sets of mapped fragments, wherein the one or more mapped fragments being segregated based on a positive mapping of keywords from the set of preference data with the set of tags associated with each tagged fragment of the one or more tagged fragments;

mining at the video navigation system, semantic context information from each mapped fragment of the one or more mapped fragments and each logical set of mapped fragments of the one or more logical sets of mapped fragments, wherein the semantic context information comprises an object specific context information and scene specific context information of each mapped fragment and each logical set of mapped fragments;

clustering at the video navigation system, the one or more logical sets of mapped fragments into corresponding one or more logical clusters of mapped fragments;

assembling at the video navigation system, at least one of the one or more logical clusters of mapped fragments in a pre-defined order of preference to obtain an assembled video, wherein each logical cluster of mapped fragments being clustered based on analysis of the set of preference data of the user and the semantic context information;

inserting at the video navigation system, one or more interactive navigation options in corresponding one or more regions, wherein the one or more interactive navigation options being inserted based on analysis of the set of preference data of the user, a real time viewing and selection behavior of the user and the semantic context information associated with each tagged video of the one or more tagged videos; and serving at the video navigation system, the assembled video and the inserted one or more interactive navigation options to the user, wherein the one or more interactive navigation options being presented as at least one type of presentation options of a pre-defined types of presentation options and wherein the one or more interactive navigation options being presented for enabling the user to navigate to the one or more discrete segments of the assembled video.

17. The computer system as recited in claim 16, wherein the one or more regions comprises one or more banner slots, one or more slots between the assembled video and one or more overlay regions covering a pre-defined area of corresponding frames of the assembled video and wherein the one or more regions for the insertion of the one or more interactive navigation options being determined by at least one of one or more publishers and one or more administrators.

18. The computer system as recited in claim 16, further comprising rendering at the video navigation system, each of one or more mapped clips corresponding to the assembled video for adding one or more interactive elements and a bi-directional flow to rendered video.

\* \* \* \* \*